(12) United States Patent
Yan et al.

(10) Patent No.: US 11,855,877 B2
(45) Date of Patent: Dec. 26, 2023

(54) INFORMATION MANAGEMENT METHOD, APPARATUS, AND SYSTEM

(71) Applicant: Huawei Technologies Co., Ltd., Shenzhen (CN)

(72) Inventors: Changjiang Yan, Beijing (CN); Shunwan Zhuang, Beijing (CN); Nan Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 130 days.

(21) Appl. No.: 16/279,398

(22) Filed: Feb. 19, 2019

(65) Prior Publication Data
US 2019/0182145 A1 Jun. 13, 2019

Related U.S. Application Data

(63) Continuation of application No. PCT/CN2017/095278, filed on Jul. 31, 2017.

(30) Foreign Application Priority Data

Aug. 19, 2016 (CN) .......................... 201610697553.6

(51) Int. Cl.
*H04L 45/00* (2022.01)
*H04L 12/46* (2006.01)
(Continued)

(52) U.S. Cl.
CPC .......... *H04L 45/20* (2013.01); *H04L 12/4633* (2013.01); *H04L 12/66* (2013.01); *H04L 45/745* (2013.01)

(58) Field of Classification Search
CPC ..... H04L 12/4633; H04L 12/66; H04L 45/20; H04L 45/745
See application file for complete search history.

(56) References Cited

U.S. PATENT DOCUMENTS 7,035,256 B1 4/2006 Neufeld et al.
7,307,990 B2 12/2007 Rosen et al.
(Continued)

FOREIGN PATENT DOCUMENTS

CN 1949740 A * 4/2007 ............ H04L 45/02
CN 1949740 A 4/2007
(Continued)

OTHER PUBLICATIONS

Rekhter, et. al. "A Border Gateway Protocol 4 (BGP-4)", Mar. 1995, Network Working Group, RFC 1771 (Year: 1995).*
(Continued)

*Primary Examiner* — Syed Ali
*Assistant Examiner* — Zhaohui Yang
(74) *Attorney, Agent, or Firm* — Conley Rose, P.C.

(57) ABSTRACT

An information management method includes that a controller generates a first message carrying an address of a first next hop of a network device. The first message includes first identification information. The first identification information instructs the network device to delete, from a next hop table stored in the network device, an entry of the first next hop corresponding to the address of the first next hop. The network device receives the first message, and deletes the entry of the first next hop as indicated by the first identification information. The controller withdraw an unavailable next hop by separately sending information about the next hop to the network device without route prefix information, effectively saving a system resource occupied for route withdrawal message exchanging between the controller and the network device, and improving service processing efficiency.

28 Claims, 8 Drawing Sheets

(51) Int. Cl.
*H04L 12/66* (2006.01)
*H04L 45/745* (2022.01)

(56) References Cited

U.S. PATENT DOCUMENTS

| | | | | |
|---|---|---|---|---|
| 2005/0262264 | A1* | 11/2005 | Ando | H04L 45/30 709/233 |
| 2006/0174035 | A1* | 8/2006 | Tufail | H04L 45/02 709/239 |
| 2006/0233181 | A1* | 10/2006 | Raszuk | H04L 45/02 370/401 |
| 2009/0116483 | A1* | 5/2009 | Anumala | H04L 45/04 370/409 |
| 2011/0069706 | A1* | 3/2011 | Sen | H04L 45/02 370/392 |
| 2012/0099420 | A1 | 4/2012 | Dharwadkar et al. | |
| 2014/0086253 | A1* | 3/2014 | Yong | H04L 45/50 370/395.53 |
| 2015/0304206 | A1* | 10/2015 | Filsfils | H04L 45/04 709/238 |
| 2015/0350060 | A1 | 12/2015 | Patil et al. | |
| 2016/0006614 | A1* | 1/2016 | Zhao | H04L 45/64 370/254 |
| 2018/0006935 | A1* | 1/2018 | Mutnuru | H04L 12/4633 |

FOREIGN PATENT DOCUMENTS

| | | |
|---|---|---|
| CN | 102201964 A | 9/2011 |
| CN | 102882797 A | 1/2013 |
| CN | 103078804 A | 5/2013 |
| CN | 103457894 A | 12/2013 |
| CN | 103516612 A | 1/2014 |
| CN | 104243317 A | 12/2014 |
| CN | 106059924 A | 10/2016 |

OTHER PUBLICATIONS

Machine Translation and Abstract of Chinese Publication No. CN1949740, Apr. 18, 2007, 8 pages.
Machine Translation and Abstract of Chinese Publication No. CN102201964, Sep. 28, 2011, 22 pages.
Machine Translation and Abstract of Chinese Publication No. CN102882797, Jan. 16, 2013, 19 pages.
Machine Translation and Abstract of Chinese Publication No. CN103457894, Dec. 18, 2013, 11 pages.
Machine Translation and Abstract of Chinese Publication No. CN103516612, Jan. 15, 2014, 15 pages.
Machine Translation and Abstract of Chinese Publication No. CN104243317, Dec. 24, 2014, 20 pages.
Machine Translation and Abstract of Chinese Publication No. CN106059924, Oct. 26, 2016, 68 pages.
Lougheed, K., et al., "A Border Gateway Protocol (BGP)," RFC1105, Jun. 1989, 17 pages.
Lougheed, K., et al., "A Border Gateway Protocol (BGP)," RFC1163, Jun. 1990, 29 pages.
Lougheed, K., et al., "A Border Gateway Protocol 3 (BGP-3)," RFC1267, Oct. 1991, 35 pages.
Reynolds, J., et al., "Assigned Numbers," RFC1700, Oct. 1994, 230 pages.
Rekhter, Y., Ed., et al., "A Border Gateway Protocol 4 (BGP-4)," RFC4271, Jan. 2006, 104 pages.
Rosen, E., et al., "BGP/MPLS IP Virtual Private Networks (VPNs)," RFC4364, Feb. 2006, 47 pages.
Bates, T., et al., "BGP Route Reflection: An Alternative to Full Mesh Internal BGP (IBGP)," RFC4456, Apr. 2006, 12 pages.
Bates, T., "Multiprotocol Extensions for BGP-4," RFC4760, Jan. 2007, 12 pages.
Scudder, J., et al., "Capabilities Advertisement with BGP-4," RFC5492, Feb. 2009, 7 pages.
Walton, D., et al., "Advertisement of Multiple Paths in BGP," draft-ietf-idr-add-paths-10, Oct. 24, 2014, 8 pages.
Gredler, H., Ed., et al., "North-Bound Distribution of Link-State and TE Information using BGP," draft-ietf-idr-ls-distribution-11, Jun. 4, 2015, 40 pages.
"Subsequent Address Family Identifiers (SAFI) Parameters," retrieved from https://www.iana.org/assignments/safi-namespace/safi-namespace.xhtml, Jul. 2000, 2 pages.
Foreign Communication From A Counterpart Application, Chinese Application No. 201610697553.6, Chinese Office Action dated Aug. 28, 2018, 14 pages.
Foreign Communication From A Counterpart Application, Chinese Application No. 201610697553.6, Chinese Search Report dated Aug. 28, 2018, 2 pages.
Foreign Communication From A Counterpart Application, PCT Application No. PCT/CN2017/095278, English Translation of International Search Report dated Oct. 31, 2017, 2 pages.
Foreign Communication From A Counterpart Application, PCT Application No. PCT/CN2017/095278, English Translation of Written Opinion dated Oct. 31, 2017, 5 pages.
Foreign Communication From A Counterpart Application, European Application No. 17840936.3, Extended European Search Report dated Jun. 27, 2019, 10 pages.
Machine Translation and Abstract of Chinese Publication No. CN103078804, May 1, 2013, 32 pages.
Foreign Communication From A Counterpart Application, Chinese Application No. 201610697553.6, Chinese Office Action dated Apr. 16, 2019, 15 pages.

* cited by examiner

INFORMATION MANAGEMENT METHOD, APPARATUS, AND SYSTEM

CROSS-REFERENCE TO RELATED APPLICATIONS

This application is a continuation of International Patent Application No. PCT/CN2017/095278 filed on Jul. 31, 2017, which claims priority to Chinese Patent Application No. 201610697553.6 filed on Aug. 19, 2016. The disclosures of the aforementioned applications are hereby incorporated by reference in their entireties.

TECHNICAL FIELD

This application relates to the field of communications technologies, and in particular, to an information management method, an apparatus, and a system.

BACKGROUND

In recent years, value of software-defined networking (SDN) has been recognized by telecommunications network operators, and the SDN is an evolution direction of a future network. An SDN system includes a controller and a network device. The controller may be used to perform network traffic control. The network device is used to perform forwarding processing on a received data packet. A control plane and a forwarding plane (also referred to as a data plane) of the network device are separated from each other using an SDN technology such that flexible network traffic control is implemented, and innovation of network services is accelerated. Currently, in an SDN scenario, the controller mainly uses the Border Gateway Protocol (BGP) to advertise a route to or withdraw a route from a forwarding device. When the controller advertises the route to the forwarding device, information about a next hop and a route prefix are sent in a bundled manner, and the information about the next hop and the route prefix are stored in a routing table. When the information about the next hop needs to be deleted, the controller needs to send a route withdrawal message to the forwarding device to delete the route prefix, and then the information about the next hop is automatically deleted. When the next hop is associated with a plurality of route prefixes, a plurality of route withdrawal messages need to be sent to respectively delete the plurality of route prefixes. Therefore, it can be learned that in the other approaches, when a controller needs to manage information about a next hop, all route prefixes associated with the next hop need to be bundled. When a plurality of route prefixes are associated with a same next hop, the plurality of route prefixes need to be separately bundled. Consequently, during management on the information about the next hop, a relatively large quantity of system resources are occupied, and service processing efficiency is affected.

SUMMARY

This application provides an information management method such that a controller can separately manage a next hop of a network device without bundling a route prefix, thereby effectively saving a system resource, and improving service processing efficiency.

According to a first aspect, this application provides an information management method. The method includes that a controller generates a first message. The first message carries an address of a first next hop of a network device. The first message includes first identification information. The first identification information is used to instruct the network device to delete, from a next hop table stored in the network device, an entry that is of the first next hop and that corresponds to the address of the first next hop. The controller sends the first message to the network device such that the network device deletes the entry of the first next hop as indicated by the first identification information.

It can be learned that, by receiving the first message that is sent by the controller and that is used to carry the address of the first next hop, the network device deletes, from the separately stored next hop table based on the first identification information carried in the first message, the entry that is of the first next hop and that corresponds to the address of the first next hop, without a need to delete the first next hop by binding the route prefix and canceling a large quantity of routing messages, thereby saving a network resource. Moreover, when a plurality of routing entries correspond to a same next hop, the plurality of routing entries using the next hop may be deleted by deleting the next hop corresponding to the plurality of routing entries. Therefore, only one message needs to be sent between the controller and the network device to rapidly delete the routing entries in batches. A quantity of messages exchanged between the controller and a forwarding device is reduced, a system resource is saved, and service processing efficiency is improved.

With reference to the first aspect, in a first possible implementation of the first aspect, the first message is a first BGP update message (UPDATE Message) or a first Path Computation Element Communication Protocol (PCEP) message.

With reference to the first aspect and the foregoing possible implementation, in a second possible implementation of the first aspect, the method further includes that the controller generates a second message. The second message carries entry information of a second next hop of the network device. The entry information of the second next hop includes a mapping relationship between an address of the second next hop of the network device and attribute information of the second next hop. The second message includes second identification information. The second identification information is used to instruct the network device to store the entry information of the second next hop into the next hop table of the network device. Then, the controller sends the second message to the network device such that the network device stores the entry information of the second next hop into the next hop table of the network device based on the second identification information.

The second next hop and the first next hop may be a same next hop, or may be different next hops. Attribute information types of the second next hop include, but are not limited to, the following parameter types, a type of the next hop, such as an Internet Protocol (IP) network or a Virtual Extensible Local Area Network (VXLAN), available bandwidth, a load balancing ratio (Weight), and the like.

In the foregoing technical solution, the controller separately sends information about the next hop to the network device, without bundling a route prefix. Therefore, the network device stores the address of the next hop and the attribute information of the next hop in the separately maintained next hop table, and the controller implements separate management on the information about the next hop of the network device. The separate management includes separately creating or updating information about a next hop. According to the foregoing solutions, next hop management by the controller on the network device is more flexible, and a system resource occupied for carrying the route prefix is effectively saved when information is exchanged between the controller and the network device for next hop management. Information that the network device needs to parse is reduced such that service processing efficiency of the network device is improved.

Further, when the controller separately sends the information about the next hop to the network device, the controller-customized attribute information of the next hop that is associated with the next hop is carried. The attribute information of the next hop is used to describe a feature different from another next hop. For example, for some applications, available bandwidth of a next hop, a load balancing ratio of a next hop, or the like needs to be described. Therefore, the network device may obtain the attribute information of the next hop in the next hop table, and send the attribute information of the next hop to a forwarding information base (also referred to as FIB) to direct packet forwarding.

With reference to the second possible implementation of the first aspect, in a third possible implementation of the first aspect, the second message is a second BGP update message or a second PCEP message.

According to a second aspect, this application provides an information management method. The method includes that a controller generates a first message. The first message carries entry information of a first next hop of a network device. The entry information of the first next hop includes a mapping relationship between an address of the first next hop of the network device and attribute information of the first next hop. The first message includes first identification information. The first identification information is used to instruct the network device to store the entry information of the first next hop into a next hop table of the network device. The controller sends the first message to the network device such that the network device stores the entry information of the first next hop into the next hop table of the network device based on the first identification information.

With reference to the first aspect and the foregoing possible implementations of the first aspect, in a fourth possible implementation of the first aspect, or with reference to the second aspect, in a first possible implementation of the second aspect, the method further includes that the controller determines control routing protocol (CRP) routing entry information. The CRP routing entry information includes a mapping relationship between a route prefix and an address of a third next hop. The controller generates a third message. The third message carries the CRP routing entry information and is used to advertise a CRP route. The third message includes third identification information. The third identification information is used to instruct the network device to store the CRP routing entry information into a CRP routing table of the network device. Then, the controller sends the third message to the network device such that the network device stores the CRP routing entry information into the CRP routing table based on the third identification information, and directs packet forwarding based on the CRP routing table.

In this way, by running the CRP protocol between the controller and the network device, the separate CRP routing table is created on the network device to store the CRP routing entry information sent by the controller. Because the CRP route advertised by the controller and a route that is advertised in a routing protocol between network devices are stored in different routing tables, a routing policy related to the CRP route does not affect a related application of a routing policy embodied by the route in the routing protocol between the network devices.

With reference to the fourth possible implementation of the first aspect, in a fifth possible implementation of the first aspect, or with reference to the first possible implementation of the second aspect, in a second possible implementation of the second aspect, the CRP routing entry information further includes a route priority, and the route priority is used to identify a priority at which the CRP route is used to direct packet forwarding.

The route priority is carried in the CRP routing entry information such that the priority of the CRP route can be flexibly set. For example, the CRP route is set to a preferred route such that the route advertised by the controller is used to control traffic. Subsequent various complex policy control for routing may be completed by upgrading the controller. This is unlike an existing routing policy, for example, a BGP routing policy, in which all devices need to implement a complex policy. Therefore, traffic control is simpler and more flexible. In addition, in some application scenarios, a customer considers that an internally deployed Interior Gateway Protocol (IGP) route is trusted and should be preferentially selected, while an external route is untrusted and should not be preferentially selected, and then the priority of the CRP route may be set to be lower than priorities of an Intermediate System to Intermediate System (ISIS) route and an Open Shortest Path First (OSPF) route. Therefore, it can be learned that different requirements of the customer may be met by setting the priority of the CRP route.

With reference to the fourth or fifth possible implementation of the first aspect, in a sixth possible implementation of the first aspect, or with reference to the first or second possible implementation of the second aspect, in a third possible implementation of the second aspect, the CRP routing entry information further includes attribute information of the third next hop, and the attribute information of the third next hop includes one or more of the following attribute information types of a next hop bandwidth, a load balancing ratio, and a type of the next hop.

The attribute information of the next hop is carried in the CRP routing entry information such that the network device may obtain the attribute information of the next hop in the CRP routing table, and send the attribute information of the next hop to the FIB to direct packet forwarding.

The attribute information of the next hop is sent to the FIB, and packet forwarding is directed based on the attribute information of the next hop such that traffic control is more flexible.

With reference to any one of the fourth to sixth possible implementations of the first aspect, in a seventh possible implementation of the first aspect, or with reference to any one of the first to third possible implementations of the second aspect, in a fourth possible implementation of the second aspect, the third message is a third BGP update message or a third PCEP message. The third BGP update message includes a multiprotocol reachable network layer reachability information (MP_REACH_NLRI) attribute field. The MP_REACH_NLRI attribute field includes a subsequent address family identifier (SAFI) field, a network layer reachability information (NLRI) field, and a next hop information field. The SAFI field indicates that the MP_REACH_NLRI attribute field is encapsulated in an encapsulation format supported by a BGP synchronization address family, and carries the third identification information. The NLRI field carries the route prefix. The next hop information field carries the address of the third next hop.

Optionally, the third BGP update message further includes a Route Synchronization Attribute field. The Route Synchronization Attribute field carries the route priority.

Optionally, the third BGP update message further includes a Next Hop Attribute field. The Next Hop Attribute field carries the attribute information of the third next hop. In a specific implementation, the Next Hop Attribute field includes at least one sub-time-length-value (TLV) field. Each next hop attribute information type corresponds to one of the at least one sub-TLV field. Each sub-TLV field includes a T field, an L field, and a V field. The T field indicates any one of the next hop attribute information types. The V field indicates content determined based on the corresponding next hop attribute information type.

The third PCEP message includes a Message-Type field, a Route object field, and a Next Hop object field. The Message-Type field carries the third identification information. The Route object field carries the route prefix. The Next Hop object field carries the address of the third next hop.

Optionally, the third PCEP message further includes a Route Attribute object field. The Route Attribute object field carries the route priority.

Optionally, the third PCEP message further includes a Next Hop Attribute object field. The Next Hop Attribute object field carries the attribute information of the third next hop. In a specific implementation, the Next Hop Attribute object field includes at least one sub-TLV field. Each next hop attribute information type corresponds to one of the at least one sub-TLV field. Each sub-TLV field includes a T field, an L field, and a V field. The T field indicates any one of the next hop attribute information types. The V field indicates content determined based on the corresponding next hop attribute information type.

With reference to any one of the fourth to seventh possible implementations of the first aspect, in an eighth possible implementation of the first aspect, or with reference to any one of the first to fourth possible implementations of the second aspect, in a fifth possible implementation of the second aspect, the method further includes the following.

First, the controller receives a fourth message sent by the network device. The fourth message carries route status report information. The route status report information includes a mapping relationship between the route prefix and status information of the CRP route. Then, the controller updates statistical information of the route prefix based on the received route status report information to use updated statistical information as a basis for re-calculating the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, by obtaining, periodically or in real time, route status information reported by the network device, the controller can learn a route status of the network device in real time, and use the route status information as a basis for adjusting the route, thereby improving traffic control reliability and real-time quality.

With reference to the first aspect and the foregoing possible implementations, in a ninth possible implementation of the first aspect, or with reference to the second aspect and the foregoing possible implementations, in a sixth possible implementation of the second aspect, the method further includes that the controller receives a fifth message sent by the network device. The fifth message carries next hop status report information. The next hop status report information includes a mapping relationship between an address of a fourth next hop and status information of the fourth next hop. Then, the controller updates statistical information of the fourth next hop based on the received next hop status report information, to use updated statistical information as a basis for re-calculating a next hop of the network device.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, by obtaining, periodically or in real time, next hop status information reported by a forwarding device, the controller can learn a status of the forwarding device in real time, and use the next hop status information as a basis for calculating and adjusting a next hop, thereby improving traffic control reliability and real-time quality.

According to a third aspect, an embodiment of this application provides an information management method. The method includes that a network device receives a first message sent by a controller. The first message carries an address of a first next hop of the network device. The first message includes first identification information. The network device deletes, as indicated by the first identification information, from a next hop table stored in the network device, an entry that is of the first next hop and that corresponds to the address of the first next hop.

It can be learned that, by receiving the first message that is sent by the controller and that is used to delete the entry of the first next hop, the network device deletes, from the separately stored next hop table based on the first identification information carried in the first message, the entry that is of the first next hop and that corresponds to the address of the first next hop, without a need to delete an unavailable next hop in a route withdrawal manner by binding the route prefix, thereby saving a network resource. Moreover, when a plurality of routing entries correspond to a same next hop, that the plurality of routing entries using the next hop are deleted by deleting the next hop corresponding to the plurality of routing entries becomes possible. Therefore, only one message needs to be sent between the controller and the network device to rapidly delete the routing entries in batches. Accordingly, a quantity of messages exchanged between the controller and a forwarding device is greatly reduced, a system resource is saved, and service processing efficiency is improved.

With reference to the third aspect, in a first possible implementation of the third aspect, that the network device deletes an entry of the first next hop as indicated by the first identification information includes the following.

As indicated by the first identification information, the network device searches the next hop table using the address of the first next hop as a keyword, hits the entry of the first next hop, and deletes the entry of the first next hop.

With reference to the third aspect and the foregoing possible implementation, in a second possible implementation of the third aspect, the method further includes the following.

The network device deletes a routing entry associated with the address of the first next hop.

In this way, when a plurality of routing entries correspond to a same next hop, that the plurality of routing entries using the next hop are deleted by deleting the next hop corresponding to the plurality of routing entries becomes possible. Therefore, only one message needs to be sent between the controller and the network device to rapidly delete the routing entries in batches. Accordingly, a quantity of messages exchanged between the controller and a forwarding device is greatly reduced, a system resource is saved, and service processing efficiency is improved.

With reference to the third aspect and the foregoing possible implementations, in a third possible implementation of the third aspect, the method further includes the following.

The network device receives a second message sent by the controller. The second message carries entry information of a second next hop of the network device. The entry information of the second next hop includes a mapping relationship between an address of the second next hop of the network device and attribute information of the second next hop. The second message includes second identification information. The network device stores the entry information of the second next hop into the next hop table as indicated by the second identification information.

According to the foregoing technical solution, the network device receives the information about the next hop that is separately sent by the controller, and stores the information about the next hop into the separately managed next hop table. Therefore, the controller implements separate management on the information about the next hop of the network device, without bundling a route prefix. The separate management includes separately creating or updating information about a next hop. According to the foregoing solutions, next hop management by the controller on the network device is more flexible, and a system resource occupied for carrying the route prefix is effectively saved when information is exchanged between the controller and the network device. Information that the network device needs to parse is reduced such that service processing efficiency of the network device is improved.

With reference to the third possible implementation of the third aspect, in a fourth possible implementation of the third aspect, the network device obtains the attribute information of the second next hop, and sends the attribute information of the second next hop to a forwarding information base to direct packet forwarding. Further, the network device may search the next hop table using the address of the second next hop as a keyword to obtain the attribute information of the second next hop.

When the controller separately sends the information about the next hop to the network device, the controller-customized attribute information of the next hop is carried. The attribute information of the next hop is used to describe a feature different from another next hop. For example, for some applications, available bandwidth of a next hop, a load balancing ratio of a next hop, or the like needs to be described. Therefore, the network device may obtain the attribute information of the next hop in the next hop table, and send the attribute information of the next hop to the FIB to direct packet forwarding.

The attribute information of the next hop is sent to the FIB to direct packet forwarding such that traffic control is more flexible.

According to a fourth aspect, an embodiment of this application provides an information management method. First, a network device receives a first message sent by a controller. The first message carries entry information of a first next hop of the network device. The entry information of the first next hop includes a mapping relationship between an address of the first next hop of the network device and attribute information of the first next hop. The first message includes first identification information. Then, the network device stores the entry information of the first next hop into a next hop table of the network device as indicated by the first identification information.

For technical effects of the technical solution provided in the fourth aspect, refer to the effect description of the third possible implementation of the third aspect. Details are not described herein again.

With reference to the third aspect and the foregoing implementations, in a fifth possible implementation of the third aspect, or with reference to the fourth aspect, in a first possible implementation of the fourth aspect, the method further includes that the network device receives a third message sent by the controller. The third message carries CRP routing entry information determined by the controller. The CRP routing entry information includes a mapping relationship between a route prefix and an address of a third next hop. The third message includes third identification information. Then, the network device stores the CRP routing entry information into a local CRP routing table as indicated by the third identification information, and directs packet forwarding based on the CRP routing table.

With reference to the fifth possible implementation of the third aspect, in a sixth possible implementation of the third aspect, or with reference to the first possible implementation of the fourth aspect, in a second possible implementation of the fourth aspect, the CRP routing entry information further includes a route priority. The route priority is used to identify a priority at which the CRP route is used to direct packet forwarding.

The route priority is carried in the CRP routing entry information such that the priority of the CRP route can be flexibly set. For example, the CRP route is set to a preferred route such that the route advertised by the controller is used to control traffic. Subsequent various complex policy control for routing may be completed by upgrading the controller. This is unlike an existing routing policy, for example, a BGP routing policy, in which all devices need to implement a complex policy. Therefore, traffic control is simpler and more flexible. In addition, in some application scenarios, a customer considers that an internally deployed IGP route is trusted and should be preferentially selected, while an external route is untrusted and should not be preferentially selected, and then the priority of the CRP route may be set to be lower than priorities of an ISIS route and an OSPF route. Therefore, it can be learned that different requirements of the customer may be met by setting the priority of the CRP route.

With reference to the fifth or sixth possible implementation of the third aspect, in a seventh possible implementation of the third aspect, or with reference to the first or second possible implementation of the fourth aspect, in a third possible implementation of the fourth aspect, the CRP routing entry information includes attribute information of the third next hop, and the attribute information of the third next hop includes one or more of the following attribute information types of a next hop, bandwidth, a load balancing ratio, and a type of the next hop.

The attribute information of the next hop is carried in the CRP routing entry information such that the network device may obtain the attribute information of the next hop in the CRP routing table, and send the attribute information of the next hop to the FIB to direct packet forwarding.

The attribute information of the next hop is sent to the FIB, and packet forwarding is directed based on the attribute information of the next hop such that traffic control is more flexible.

With reference to any one of the fifth to seventh possible implementations of the third aspect, in an eighth possible implementation of the third aspect, or with reference to any one of the first to third possible implementations of the fourth aspect, in a fourth possible implementation of the fourth aspect, the method further includes the following.

First, the controller receives a fourth message sent by the network device. The fourth message carries route status report information. The route status report information includes a mapping relationship between the route prefix and status information of the CRP route. Then, the controller updates statistical information of the route prefix based on the received route status report information, to use updated statistical information as a basis for re-calculating the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, by obtaining, periodically or in real time, route status information reported by the network device, the controller can learn a route status of the network device in real time, and use the route status information as a basis for adjusting the route, thereby improving traffic control reliability and real-time quality.

With reference to the eighth possible implementation of the third aspect, in a ninth possible implementation of the third aspect, or with reference to the fourth possible implementation of the fourth aspect, in a fifth possible implementation of the second aspect, the fourth message is a fourth BGP update message or a fourth PCEP message.

The fourth BGP update message includes an MP_REACH_NLRI attribute field and a Route Status Report Attribute field. The MP_REACH_NLRI attribute field includes an NLRI field. The NLRI field is used to carry the route prefix. The Route Status Report Attribute field is used to carry the status information of the CRP route. In a specific implementation, the Route Status Report Attribute field includes at least one sub-TLV field. Each CRP route status information type corresponds to one of the at least one sub-TLV field. Each sub-TLV field includes a T field, an L field, and a V field. The T field indicates any one of the CRP route status information types. The V field indicates content determined based on the corresponding CRP route status information type.

The fourth PCEP message includes a Message-Type field, a Route object field, and a Route Status Report Attribute object field. The Message-Type field indicates that the fourth PCEP message is used to send the route status report information to the controller. The Route object field carries the route prefix. The Route Status Report Attribute object field carries the status information of the CRP route. In a specific implementation, the Route Status Report Attribute object field includes at least one sub-TLV field. Each CRP route status information type corresponds to one of the at least one sub-TLV field. Each sub-TLV field includes a T field, an L field, and a V field. The T field indicates any one of the CRP route status information types. The V field indicates content determined based on the corresponding CRP route status information type.

With reference to the third aspect and the foregoing possible implementations, in a tenth possible implementation of the third aspect, or with reference to the fourth aspect and the foregoing possible implementations, in a sixth possible implementation of the second aspect, the method further includes that the controller receives a fifth message sent by the network device. The fifth message carries next hop status report information. The next hop status report information includes a mapping relationship between an address of a fourth next hop and status information of the fourth next hop. Then, the controller updates statistical information of the fourth next hop based on the received next hop status report information to use updated statistical information as a basis for re-calculating a next hop of the network device.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, by obtaining, periodically or in real time, next hop status information reported by a forwarding device, the controller can learn a status of the forwarding device in real time, and use the next hop status information as a basis for calculating and adjusting a next hop, thereby improving traffic control reliability and real-time quality.

With reference to the tenth possible implementation of the third aspect, in an eleventh possible implementation of the third aspect, or with reference to the fifth possible implementation of the fourth aspect, in the seventh possible implementation of the second aspect, the fifth message is a fifth BGP update message or a fifth PCEP message.

The fifth BGP update message includes an MP_REACH_NLRI attribute field and a Next Hop Status Report Attribute field. The MP_REACH_NLRI attribute field includes a NLRI field. The NLRI field is used to carry the address of the fourth next hop. The Next Hop Status Report Attribute field is used to carry the status information of the fourth next hop. In a specific implementation, the Next Hop Status Report Attribute field includes at least one sub-TLV field. Each next hop status information type corresponds to one of the at least one sub-TLV field. Each sub-TLV field includes a T field, an L field, and a V field. The T field indicates any one of the next hop status information types. The V field indicates content determined based on the corresponding next hop status information type.

The fifth PCEP message includes a Message-Type field, a Next Hop object field, and a Next Hop Status Report Attribute object field. The Message-Type field indicates that the fifth PCEP message is used to send the next hop status report information to the controller. The Next Hop object field carries the address of the fourth next hop. The Next Hop Status Report Attribute object field carries the status information of the fourth next hop. In a specific implementation, the Next Hop Status Report Attribute object field includes at least one sub-TLV field. Each next hop status information type corresponds to one of the at least one sub-TLV field. Each sub-TLV field includes a T field, an L field, and a V field. The T field indicates any one of the next hop status information types. The V field indicates content determined based on the corresponding next hop status information type.

According to a fifth aspect, an embodiment of this application provides a controller configured to perform the method in the first aspect, any possible implementation of the first aspect, the second aspect, or any possible implementation of the second aspect. Further, the controller includes a module configured to perform the method in the first aspect, any possible implementation of the first aspect, the second aspect, or any possible implementation of the second aspect.

According to a sixth aspect, an embodiment of this application provides a network device configured to perform the method in the third aspect, any possible implementation of the third aspect, the fourth aspect, or any possible implementation of the fourth aspect. Further, the network device includes a module configured to perform the method in the third aspect, any possible implementation of the third aspect, the fourth aspect, or any possible implementation of the fourth aspect.

According to a seventh aspect, an embodiment of this application provides a communications system, including the controller provided in the fifth aspect and the network device provided in the sixth aspect.

According to an eighth aspect, an embodiment of this application provides a controller. The controller includes an input interface, an output interface, a processor, and a memory. The input interface, the output interface, the processor, and the memory may be connected using a bus system. The memory is configured to store a program, an instruction, or code. The processor is configured to execute the program, the instruction, or the code in the memory to complete the method in the first aspect, any possible implementation of the first aspect, the second aspect, or any possible implementation of the second aspect.

According to a ninth aspect, an embodiment of this application provides a network device. The network device includes an input interface, an output interface, a processor, and a memory. The input interface, the output interface, the processor, and the memory may be connected using a bus system. The memory is configured to store a program, an instruction, or code. The processor is configured to execute the program, the instruction, or the code in the memory, to complete the method in the third aspect, any possible implementation of the third aspect, the fourth aspect, or any possible implementation of the fourth aspect.

According to a tenth aspect, an embodiment of this application provides a communications system, including the controller provided in the eighth aspect and the network device provided in the ninth aspect.

According to an eleventh aspect, an embodiment of this application provides a computer-readable storage medium configured to store a computer program. The computer program is configured to execute an instruction in the first aspect, any possible implementation of the first aspect, the second aspect, any possible implementation of the second aspect, the third aspect, any possible implementation of the third aspect, the fourth aspect, or any possible implementation of the fourth aspect.

DESCRIPTION OF EMBODIMENTS

Application scenarios described in embodiments of this application are intended to more clearly describe the technical solutions of the embodiments of this application, and do not constitute any limitation on the technical solutions provided in the embodiments of this application. A person of ordinary skill in the art may know that, with evolution of network architectures and emergence of new service scenarios, the technical solutions provided in the embodiments of this application are also applicable to similar technical problems.

Unless otherwise stated, ordinal numbers such as "first", "second", "third", "fourth", and "fifth" in the embodiments of this application are intended to distinguish a plurality of objects and do not limit a sequence of the plurality of objects.

Figure 1:
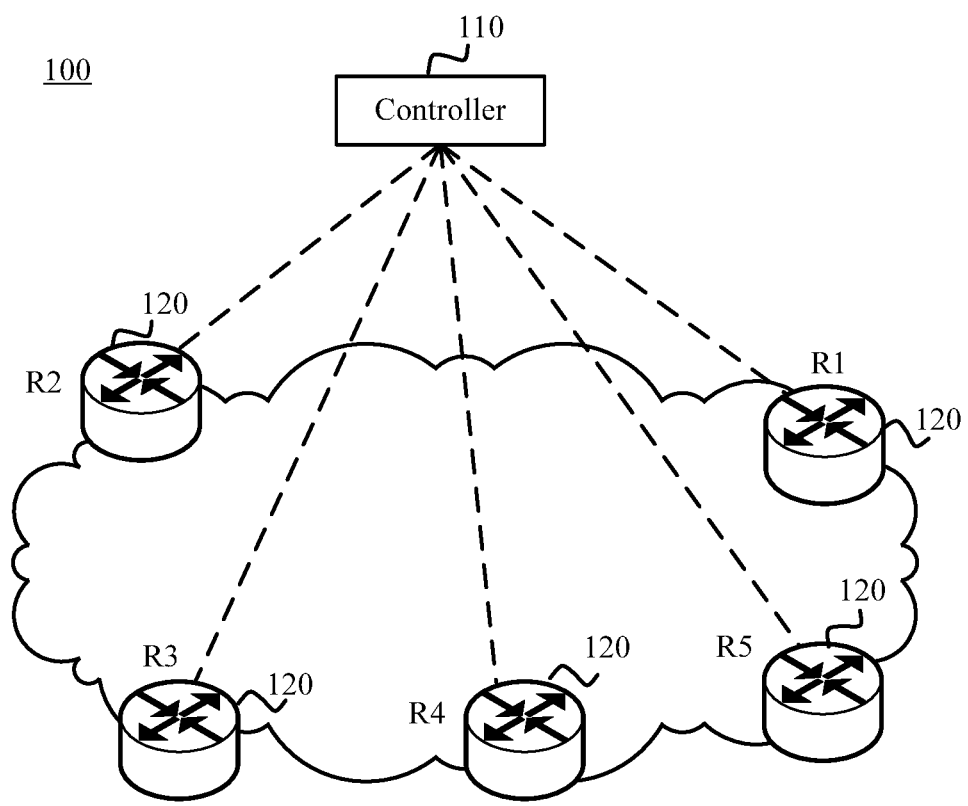
FIG. 1 is a schematic diagram of an application scenario according to an embodiment of this application.

The following describes an application scenario in an embodiment of this application with reference to FIG. 1.

FIG. 1 shows an SDN 100 to which an embodiment of this application is applied. The SDN 100 includes a controller 110 and a plurality of network devices 120. In this application, the controller 110 may also be referred to as a control device, a control system, or a control node. Optionally, the controller 110 may be a smart network controller (SNC), but this embodiment of this application is not limited thereto.

The network device 120 may be configured to perform packet forwarding processing. Further, the network device may be a routing network device such as a conventional router or switch in a conventional path computation element (PCE) network, or may be a routing network device such as a router or a switch in an SDN based on that control is separated from forwarding. This is not limited in this embodiment of this application.

FIG. 1 shows five routers, R1 to R5. It should be understood that, FIG. 1 shows one controller and five routers only as an example, and the SDN 100 may include any other quantities of controllers and network devices. This is not limited in this embodiment of this application.

Figure 2A:
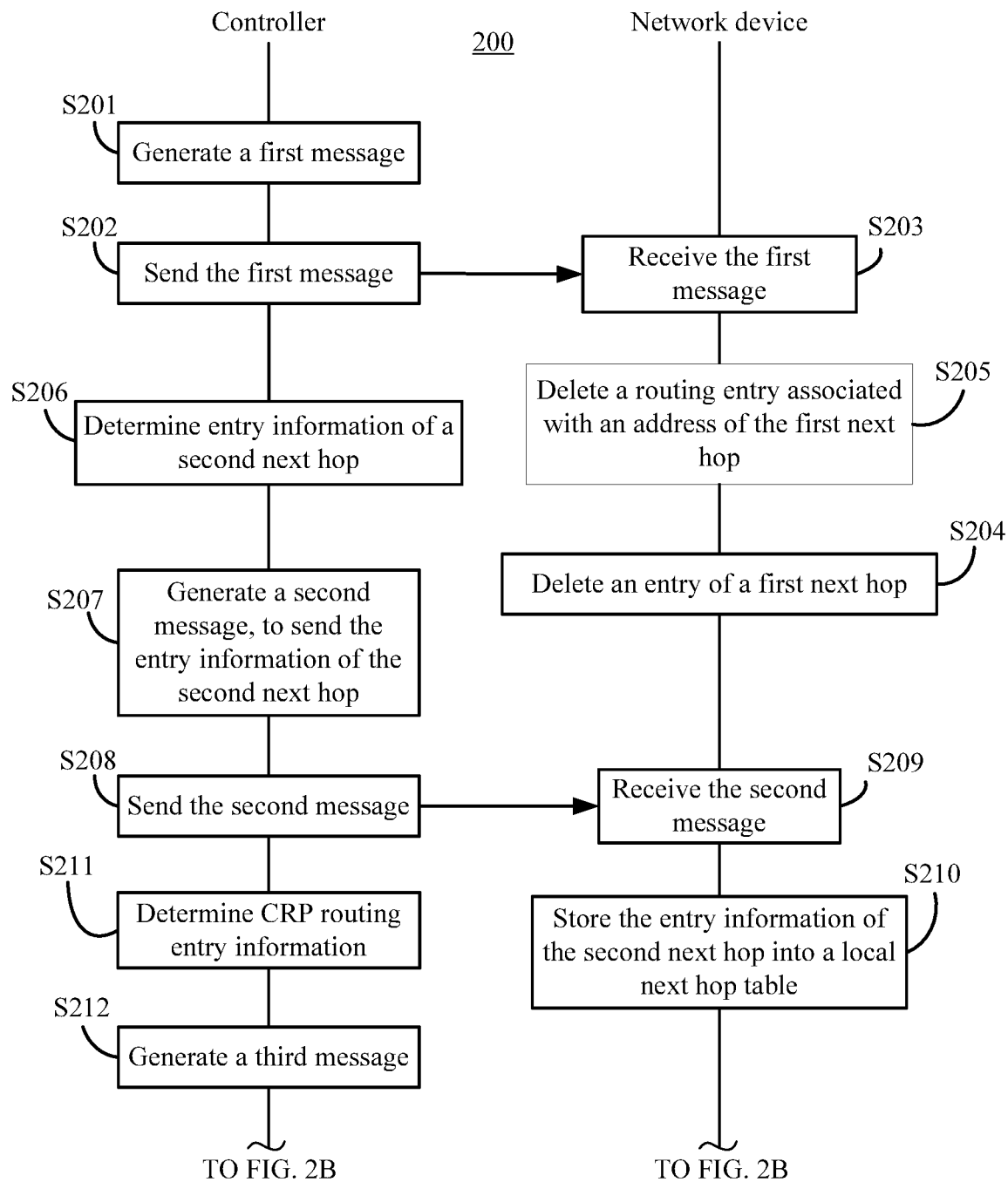
FIG. 2A and FIG. 2B are a schematic flowchart of an information management method according to an embodiment of this application.
Figure 2B:
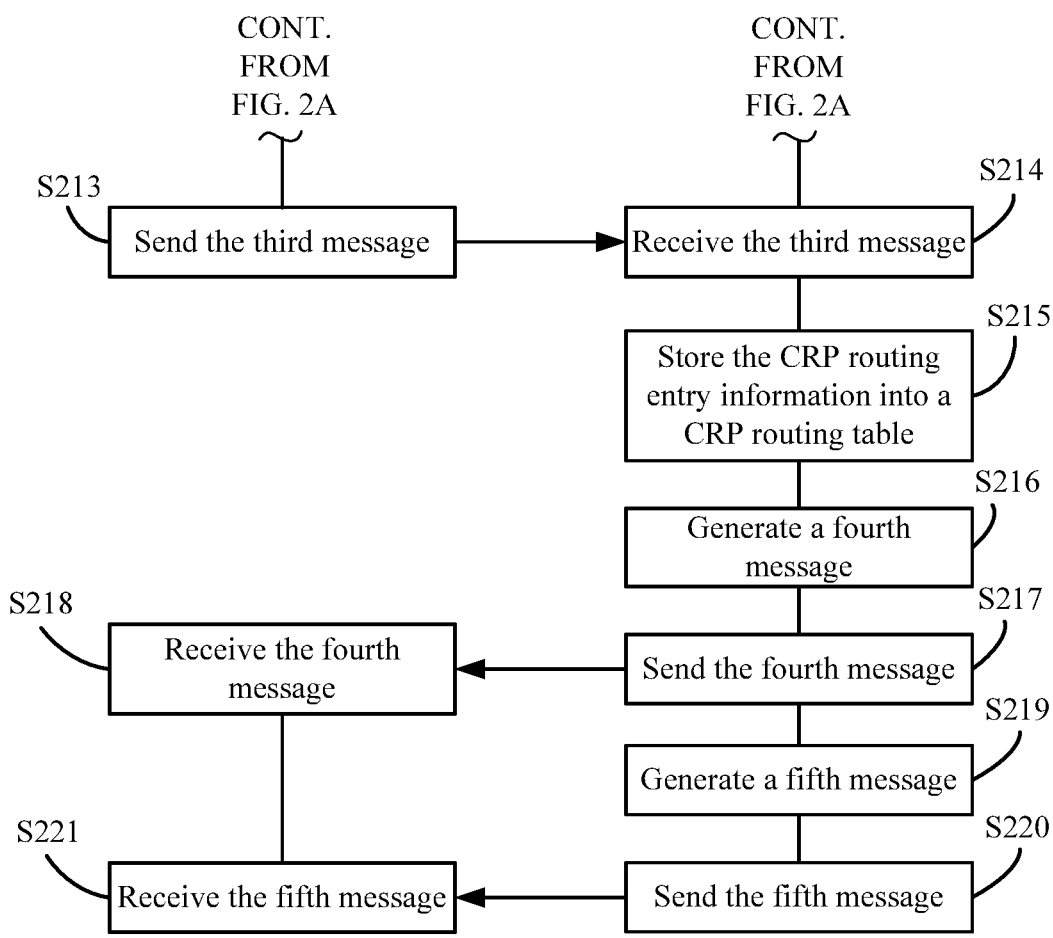

The following describes, in detail with reference to FIG. 2A and FIG. 2B, an information synchronization method 200 provided in an embodiment of this application. The method 200 may be applied to the SDN 100 shown in FIG. 1, but this embodiment of this application is not limited thereto. As shown in FIG. 2A and FIG. 2B, the method includes the following steps.

Step S201. A controller generates a first message.

The first message carries an address of a first next hop of a network device. The first message includes first identification information. The first identification information is used to instruct the network device to delete, from a next hop table stored in the network device, an entry that is of the first next hop and that corresponds to the address of the first next hop.

In a specific implementation, the controller may be configured to control network traffic. For example, the controller may be the controller 110 shown in FIG. 1. The network device may be any one of R1 to R5 shown in FIG. 1. In an optional example, the controller may be an SNC, but this is not limited in this embodiment of this application.

It should be noted that, the network device stores information about a next hop in a table separately maintained by the network device, and the table is referred to as a "next hop table".

In a specific implementation, the network device maintains only one next hop table, and the one next hop table is associated with all routing tables maintained by the network device. Further, each next hop entry in the next hop table includes a mapping relationship between an address of a next hop and attribute information of the next hop. A routing table includes a mapping relationship between a route prefix and an address of a next hop. In the routing table, a plurality of different route prefixes may correspond to an address of a same next hop A. That is, the routing table includes a plurality of routing entries, and route prefixes of the plurality of routing entries are different, but correspond to the address of the same next hop A. The next hop table in the network device also includes an entry, which is used to include the address of the next hop A and attribute information of the next hop A. The network device associates the entry of the next hop A with all routing entries that are in the routing table and that use the address of the next hop A.

The "all routing tables" include a plurality of routing tables used by the network device to store routes advertised using different protocols.

In another specific implementation, the network device separately maintains a plurality of next hop tables, and each next hop table corresponds to a routing table for storing a route advertised using each protocol. For example, a next hop table 1 corresponds to an ISIS routing table, and a next hop table 2 corresponds to a CRP routing table. That is, the plurality of next hop tables are respectively associated with the plurality of routing tables, and a one-to-one mapping relationship exists between the plurality of next hop tables and the plurality of routing tables.

For example, an address of a next hop may be used as an index, to find all routing entries using the address of the next hop. A person skilled in the art may understand that, a possibility that another field is used as an index to find the routing entries corresponding to the address of the next hop is not precluded, and this is only for an illustrative purpose, and should not be construed as any limitation on this application.

For example, a format of the next hop table may be shown in Table 1

TABLE 1

| Next-Hop | Type | Status | Band Width (kilobits (kbit)/ second (sec)) | Weight | (Another field) |
|---|---|---|---|---|---|
| 1.1.1.1 | IP | 0xC0000000 | 20,000 | 100 | |
| 2.2.2.2 | VXLAN | 0xC0000000 | 40,000 | 100 | |

As shown in Table 1, the next hop table includes a plurality of next hop entries, and includes a plurality of fields:

Next-Hop field: indicates an address of a next hop.

Type field: indicates an access type of the next hop, for example, an IP network or a VXLAN.

Status field: indicates a status of the next hop.

Band Width field: indicates available bandwidth of the next hop.

Weight field: indicates a load balancing ratio of the next hop in percentage, where 100 indicates that the next hop does not participate in load balancing.

In a specific implementation, the "Status" field may include 32 bits, and each bit represents one state of a next hop. For example, an encapsulation format of the "Status" field is shown in Table 2:

TABLE 2

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| V | U | | | | | | | | | | | | | | |

V, namely, valid: 1 indicates a valid next hop, while 0 indicates an invalid next hop.
U, namely, used: 1 indicates a used next hop, while 0 indicates an unused next hop.

Illustration of an example of Status coding:

0xC0000000: Both V and U bits are 1, indicating that the next hop is valid and is being used.

In this example, how to use the Status field in the next hop table is described with reference to this application using the foregoing two bits as an example. A person skilled in the art may understand that, 0 and 1 of the two bits may alternatively indicate opposite meanings, for example:

V, namely, valid: 0 indicates a valid next hop, while 1 indicates an invalid next hop.

U, namely, used: 0 indicates a used next hop, while 1 indicates an unused next hop.

Alternatively, another value may be used to indicate the foregoing status information. This is not limited in this embodiment of this application.

A person skilled in the art may understand that, the Status field may alternatively be encapsulated in another encapsulation format, and this is only for an illustrative purpose, and should not be construed as any limitation on this application.

It should be understood that, next hop entry information listed in Table 1 is only an example, and does not constitute any limitation on this application. In addition, although a plurality of pieces of information are listed in Table 1, a person skilled in the art may understand that, the next hop entry information may include one or more of the plurality of pieces of information instead of all the information. Alternatively, the next hop entry information may include only information indicated by another field that is not listed herein. This is not limited in this embodiment of this application.

In a specific implementation, the first message is a first BGP update message. The first BGP update message includes a multiprotocol unreachable network layer reachability information (MP_UNREACH_NLRI) attribute field. The MP_UNREACH_NLRI attribute field includes an SAFI field and an unreachable NLRI field. The SAFI field indicates that the MP_UNREACH_NLRI attribute field is encapsulated in an encapsulation format supported by a BGP synchronization address family, and carries the first identification information. The unreachable NLRI field carries the address of the first next hop.

Optionally, the first identification information may be directly indicated by an SAFI value in the BGP synchronization address family SAFI field.

Figure 3:
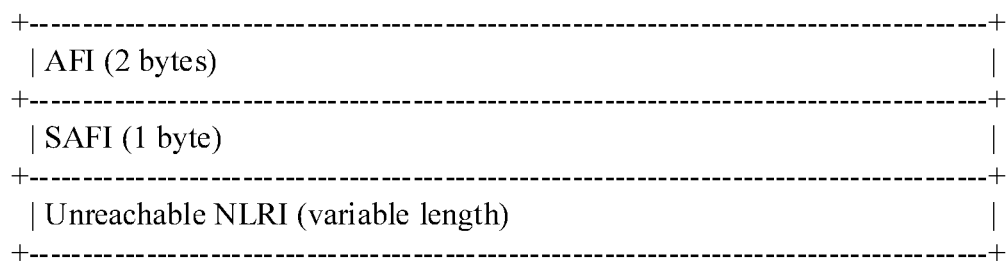
FIG. 3 is a schematic diagram of an MP_UNREACH_NLRI field encapsulated in an encapsulation format supported by a BGP synchronization address family according to an embodiment of this application.

An encapsulation format of MP_UNREACH_NLRI that is supported by the BGP synchronization address family is shown in FIG. 3.

MP_UNREACH_NLRI may be understood as multiprotocol extension attribute information of unreachable NLRI, and includes two parts, an address family information field and an unreachable NLRI part.

The address family information field includes an address family identifier (AFI) field (two bytes) and an SAFI field (one byte). The AFI field carries an address family identifier of a network layer protocol to identify the network layer protocol. For example, an AFI being 1 indicates IP version 4 (IPv4), and an AFI being 2 indicates IP version 6 (IPv6). The SAFI field identifies a subsequent address family type. For example, an SAFI being 1 indicates unicast, an SAFI being 2 indicates multicast, and an SAFI being 128 indicates a virtual private network (VPN). Further, an AFI value being 1 and an SAFI value being 1 indicates that the NLRI field carries an IPv4 unicast route, an AFI value being 1 and an SAFI value being 128 indicates that the NLRI field carries a BGP-VPNv4 route, an AFI value being 1 and an SAFI value being 4 indicates that the NLRI field carries a BGP label route.

In this embodiment of this application, the BGP synchronization address family may be understood as a subsequent address family extended from an existing IPv4 or IPv6 address family in the BGP protocol. That is, the AFI value may be 1 or 2. The SAFI value may be determined according to a standard formulated by the international Internet Engineering Task Force (IETF).

The unreachable NLRI part includes the unreachable NLRI field.

In a specific implementation, the unreachable NLRI field may be identified by a 2-tuple <Length-Next Hop>. Length indicates a length of a next hop address field, in units of bytes. Next Hop includes an address of a next hop, and is followed by trailing bits, which are used to ensure that the end of the field complies with a byte boundary, where values of the trailing bits have no meaning.

Figure 4:
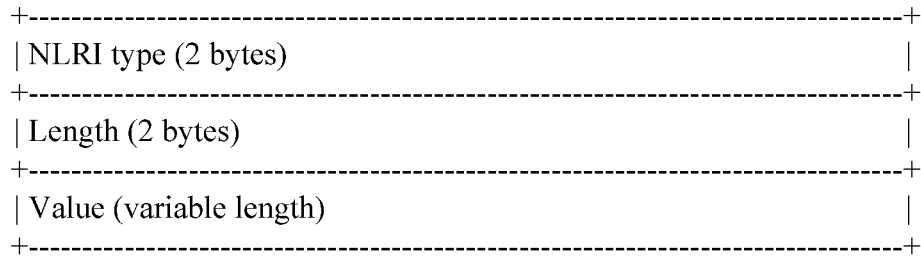
FIG. 4 is a schematic diagram of a TLV field in an unreachable NLRI field according to an embodiment of this application.

In another specific implementation, the unreachable NLRI field may include a TLV field (variable length). For a schematic diagram of the TLV field, refer to FIG. 4. A type T field indicates that a type of the TLV field is a BGP synchronization type. The length L field indicates a length of the V field. The value V field carries content determined based on the BGP synchronization type. In this embodiment of this application, the T field value being 1 may identify a BGP next hop synchronization type. Optionally, a value of the L field has 16 bits, namely, two bytes, indicating a specific length value of the V field. For example, when the L field is 4, the V field is a four-byte IPv4 address, when the L field is 16, the V field is a 16-byte IPv6 address.

It should be understood that the Type1 type is the BGP next hop synchronization type, as listed herein, is only for an illustrative purpose, and should not constitute any limitation on this application. This embodiment of this application does not exclude a possibility that Type1 is used to indicate another type, or another manner is used to indicate the BGP next hop synchronization type. Moreover, a quantity of types in NLRI Type is not limited in this embodiment of this application either.

In another specific implementation, the first message is a first PCEP message. The first PCEP message includes a Message-Type field and a Next Hop object field. The Message-Type field indicates that the first PCEP message is used to send the address of the first next hop to the network device, and is used to carry the first identification information. The Next Hop object field carries the address of the first next hop. In this embodiment of this application, the first PCEP message may also be referred to as a PCE-initiated next hop message PCE-initiated Next Hop Message. Usually, a PCEP message includes a common message header and a variable-length message body. The message body includes a series of objects. Further, the first PCEP message includes a common message header and a next hop object.

Figure 5:
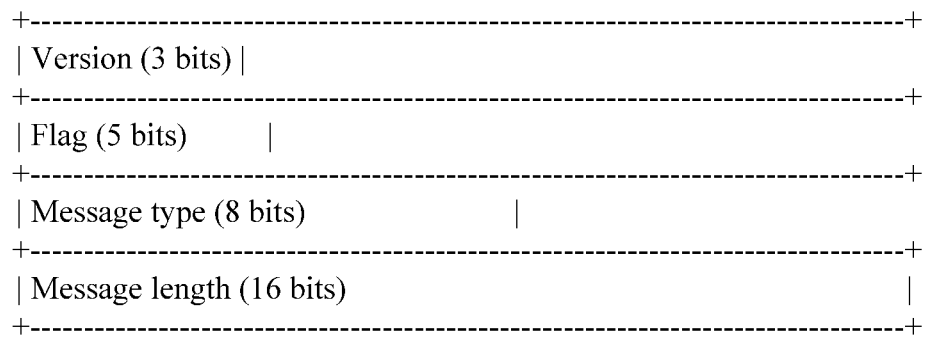
FIG. 5 is a schematic diagram of an encapsulation format of a common message header of a PCEP message according to an embodiment of this application.

An encapsulation format of the common message header of the first PCEP message is shown in FIG. 5. FIG. 5 is a schematic diagram of the encapsulation format of the common message header of the first PCEP message according to an embodiment of this application.

Fields in the common message header are explained as follows.

Version field (three bits): identifies a PCEP version number, where a current version number is 1.

Flag field (five bits): indicates a flag, where currently, the flag is not defined, assigned five bits are reserved bits, a transmit end needs to set the bits to 0, and a receive end needs to ignore the bits.

Message type field (eight bits): indicates a message type, which is to be defined.

In this embodiment of this application, the first PCEP message (for example, the PCE-initiated next hop message PCE-initiated Next Hop Message) may be understood as a message type extended from the Message-Type in the existing PCEP protocol, and a Message-Type value may be determined according to a standard formulated by the IETF.

Message length field (16 bits): indicates a total length (including a length of the common header) of the PCEP message, in units of bytes.

Figure 6:
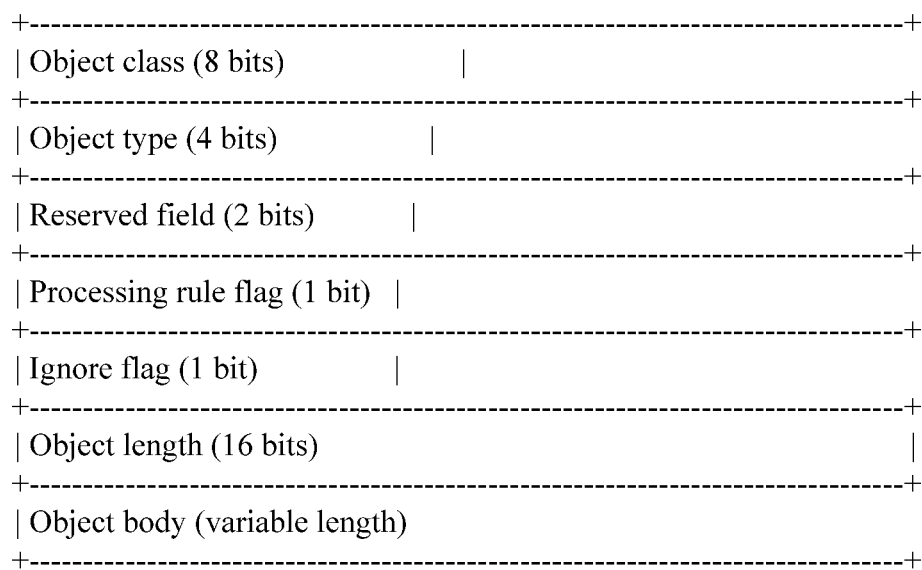
FIG. 6 is a schematic diagram of an encapsulation format of a Next Hop object in a PCEP message according to an embodiment of this application.

For example, an encapsulation format of the next hop object Next Hop object is shown in FIG. 6.

Fields of the Next Hop object are explained as follows.

An Object class (8 bits) value is to be defined, and is managed by the Internet Assigned Numbers Authority (IANA). When an Object type (4 bits) value is 1, an Object body (variable length) carries a four-byte-long IPv4 unicast address, when a value is 2, the Object body carries a 16-byte-long IPv6 unicast address. The Next Hop object is uniquely determined by Object class and Object type.

A Reserved field (2 bits) is filled with 0 on transmission, and is ignored on receipt.

A Processing rule flag (1 bit) field and an Ignore flag (1 bit) field are not used in this Next Hop object, and are set to 0.

An Object length (16 bits) value is a length, including a length of an object header, of the Next Hop object.

It should be understood that, values and/or lengths of the fields listed herein are only for an illustrative purpose, and should not constitute any limitation on this application. This embodiment of this application does not exclude a possibility that the value of the Object-Type field is another value.

In a specific implementation, the first identification information is carried based on extended Message-Type to instruct the network device to delete, from a locally stored next hop table, an entry that is of the first next hop and that corresponds to the address of the first next hop. The first identification information is directly indicated by the Message-Type value in the Message-Type field.

In another specific implementation, the first PCEP message further includes a status request parameters (RPs) object field. That the Message-Type field carries the first identification information includes that the Message-Type field and the RP object field jointly carry the first identification information. That is, the first identification information is jointly indicated by the Message-Type value in the Message-Type field and a value of an R flag in the RP object field. For explanations of fields in the RP object, refer to related definitions in RFC 5440. Further, the Message-Type field is used to identify that the first PCEP message is a message used to send the address of the first next hop. When the R flag in the RP object is set to 1, the network device deletes, from a locally stored next hop table, an entry that is of the first next hop and that corresponds to the address of the first next hop. That is, the Message-Type field and the RP object field jointly carry the first identification information.

A person skilled in the art may understand that, a field that is used together with the Message-Type field to jointly carry the first identification information is not limited to the RP object field. Alternatively, another existing or newly added field may be used. This is not limited in this application. Moreover, that the R flag is set to 1, and the network device deletes, from the locally stored next hop table, the entry that is of the first next hop and that corresponds to the address of the first next hop, as listed herein, should not constitute any limitation on this application either. Alternatively, when the R flag is set to 0 or another value, the network device may delete the entry of the first next hop. This embodiment of this application does not exclude a possibility that the network device deletes the entry of the first next hop when the R flag is set to 0 or another value.

Step S202. The controller sends the first message to a network device.

Step S203. The network device receives the first message.

Step S204. The network device deletes an entry of a first next hop from a next hop table as indicated by the first identification information.

Further, after receiving the first message, the network device searches the next hop table for an entry using the address of the first next hop that is carried in the first message as a keyword, and if the entry of the first next hop is hit, deletes the entry of the first next hop from the next hop table. If no corresponding entry is hit, processing ends.

Optionally, the method further includes the following steps.

Step S205. The network device deletes a routing entry associated with an address of the first next hop.

Further, the network device stores a plurality of routing tables, and each routing table may include a routing entry associated with the address of the first next hop. When the address of the first next hop is unavailable, the network device finds, using the address of the first next hop as an index, all routing entries using the address of the first next hop, and deletes all the routing entries associated with the address of the first next hop.

According to the technical solutions provided in this embodiment, when a plurality of route prefixes corresponds to a same next hop, a plurality of routing entries using the next hop may be deleted by deleting the next hop corresponding to the plurality of route prefixes. In the other approaches, assuming that 1000 route prefixes correspond to an address of a same next hop, the controller needs to send 1000 route withdrawal messages to delete routes associated with the 1000 route prefixes. The 1000 route prefixes are encapsulated in the plurality of route withdrawal messages. After receiving the plurality of route withdrawal messages, the network device parses the messages one by one and deletes the routes to delete the unavailable next hop. However, with the method provided in this embodiment of this application, only one message needs to be sent between the controller and a forwarding device to rapidly delete routing entries in batches. Therefore, a quantity of messages exchanged between the controller and the forwarding device is greatly reduced, a system resource is saved, and service processing efficiency is improved.

Optionally, the method 200 may further include steps S206 to S210.

Step S206. The controller determines entry information of a second next hop of the network device.

The entry information of the second next hop includes a mapping relationship between an address of the second next hop and attribute information of the second next hop.

It should be noted that, the second next hop and the first next hop may be a same next hop, or the second next hop and the first next hop may be different next hops.

Attribute information types of the second next hop include, but are not limited to, the following parameter types an access type of the next hop, such as an IP network or a VXLAN, available bandwidth, a load balancing ratio (Weight), and the like.

Step S207. The controller generates a second message to send the entry information of the second next hop.

Further, the controller generates the second message. The second message carries the entry information of the second next hop. The second message includes second identification information. The second identification information is used to instruct the network device to store the entry information of the second next hop into the next hop table of the network device. The entry information of the second next hop does not need to include a route prefix such that the controller may separately send information about the next hop to the network device.

That the second identification information is used to instruct the network device to store the entry information of the second next hop into the next hop table includes the second identification information is used to instruct the network device to create or update the entry information of the second next hop in the next hop table.

In a specific implementation, the second message is a second BGP update message. The second BGP update message includes an MP_REACH_NLRI attribute field and a Next Hop Attribute field. The MP_REACH_NLRI attribute field includes an SAFI field, an NLRI field, and a next hop information field. The SAFI field indicates that the MP_REACH_NLRI attribute field is encapsulated in an encapsulation format supported by a BGP synchronization address family, and carries the second identification information. The NLRI field carries the address of the second next hop. The Next Hop Attribute field carries the attribute information of the second next hop. In an optional implementation, the Next Hop Attribute field includes at least one sub-TLV field. Each next hop attribute information type corresponds to one of the at least one sub-TLV field. Each sub-TLV field includes a T field, an L field, and a V field. The T field indicates any one of the attribute information types of the second next hop. The V field indicates content determined based on the corresponding attribute information type of the second next hop.

The second identification information is directly indicated by an SAFI value in the BGP synchronization address family SAFI field.

In this embodiment of this application, a BGP synchronization address family may be newly added in an existing BGP address family, and the entry information of the second next hop is encapsulated in an encapsulation format supported by the newly added BGP synchronization address family. Further, the encapsulation format of MP_REACH_NLRI that is supported by the BGP synchronization address family is shown in FIG. 7.

Figure 7:
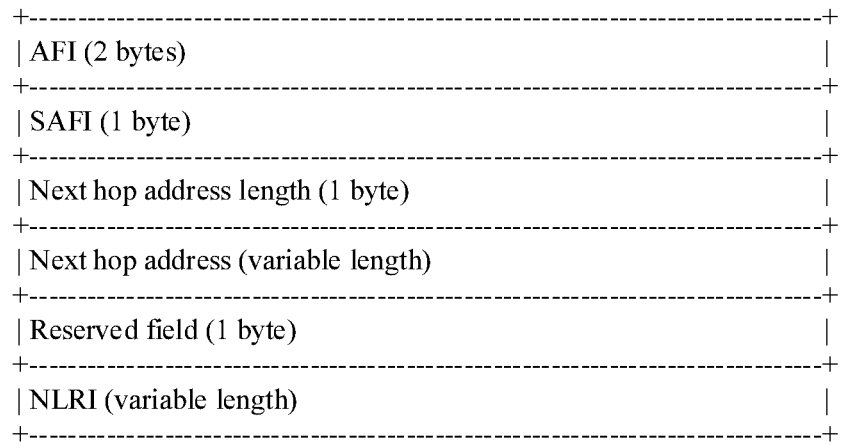
FIG. 7 is a schematic diagram of an MP_REACH_NLRI field encapsulated in an encapsulation format supported by a BGP synchronization address family according to an embodiment of this application.

FIG. 7 is a schematic diagram of the MP_REACH_NLRI attribute field encapsulated in the encapsulation format supported by the BGP synchronization address family according to an embodiment of this application.

MP_REACH_NLRI may be understood as multiprotocol extension attribute information of NLRI, and includes three parts, an address family information field, a next hop information field, and an NLRI field.

For a description of the address family information field, refer to the foregoing description of the address family information field made with reference to FIG. 3. Details are not described herein again.

In this embodiment of this application, the BGP synchronization address family may be understood as a subsequent address family extended from an existing IPv4 or IPv6 address family in the BGP protocol. That is, the AFI value may be 1 or 2. The SAFI value may be determined according to a standard formulated by the international IETF.

The next hop information field includes a next hop address length field (one byte) and a next hop address field (variable length). The next hop address length field is used to identify a length of the next hop address field. The length of the next hop address field is determined by the length indicated by the next hop address length field.

A one-byte reserved field exists between the next hop information field and the NLRI part.

The NLRI part includes the NLRI field.

In a specific implementation, the NLRI field may be indicated by a 2-tuple <Length-Prefix>. Length: indicates a length of a route prefix, in units of bytes. Prefix: includes a route prefix, and is followed by trailing bits, which are used to ensure that the end of the field complies with a byte boundary, where values of the trailing bits have no meaning.

Figure 8:
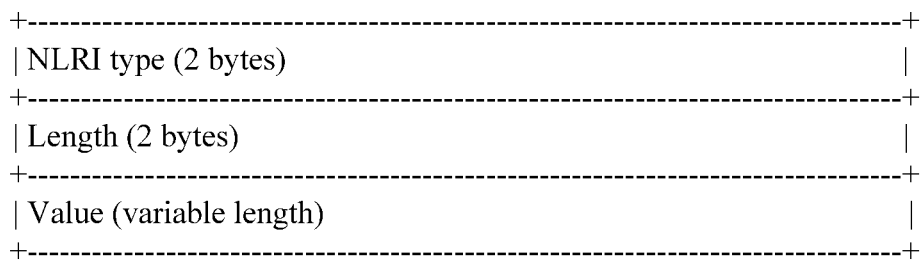
FIG. 8 is a schematic diagram of a TLV field in an NLRI field according to an embodiment of this application.

In another specific implementation, the NLRI field includes a TLV field (variable length). FIG. 8 is a schematic diagram of the TLV field in the NLRI field according to an embodiment of this application. A type T field indicates that a type of the TLV field is a BGP synchronization type. A length L field indicates a length of a V field. The value V field carries content determined based on the BGP synchronization type. In this embodiment of this application, further, the T field value being 1 may identify a BGP next hop synchronization type. Optionally, a value of the L field has 16 bits, namely, two bytes, and the V field is a route prefix of a length indicated by the value of the L field. The BGP synchronization type includes the BGP next hop synchronization type.

It should be understood that, that the Type1 type is the BGP next hop synchronization type, as listed herein, is only for an illustrative purpose, and should not constitute any limitation on this application. This embodiment of this application does not exclude a possibility that Type1 is used to indicate another type, or another manner is used to indicate the BGP next hop synchronization type. Moreover, a quantity of types in NLRI Type is not limited in this embodiment of this application either.

In another specific implementation, the second message is a second PCEP message. The second PCEP message includes a Message-Type field, a Next Hop object field, and a Next Hop Attribute object field. The Message-Type field is used to carry the second identification information. The Next Hop object field carries the address of the second next hop. The Next Hop Attribute object field carries the attribute information of the second next hop. In an optional implementation, the Next Hop Attribute object field includes at least one sub-TLV field. Each next hop attribute information type corresponds to one of the at least one sub-TLV field. Each sub-TLV field includes a T field, an L field, and a V field. The T field indicates any one of the next hop attribute information types. The V field indicates content determined based on the corresponding next hop attribute information type.

Optionally, the second identification information is directly indicated by a Message-Type value in the Message-Type field.

In this embodiment of this application, Message-Type in the second PCEP message may be understood as a message type extended from the Message-Type in the existing PCEP protocol, and the Message-Type value may be determined according to a standard formulated by the IETF. A Message-Type value is newly defined to indicate that the second PCEP message is a message used to update or create a next hop. The second PCEP message may also be referred to as a PCE-initiated next hop message PCE-initiated Next Hop Message.

Optionally, the second PCEP message further includes a status request parameters RPs object field. That the Message-Type field is used to carry the second identification information includes that the Message-Type field and the RP object field jointly carry the second identification information. That is, the second identification information is jointly indicated by the Message-Type value in the Message-Type field and a value of an R flag in the RP object field.

Further, for an encapsulation format of the RP object and explanations of fields, refer to related definitions in RFC 5440. The Message-Type field is used to identify that the second PCEP message is a message used to separately send information about the next hop. The information about the next hop includes at least the address of the next hop. When the R flag in the RP object is set to 0, the network device stores entry information of the second next hop into the local next hop table. That is, the Message-Type field and the RP object field jointly carry the second identification information.

A person skilled in the art may understand that, a field that is used together with the Message-Type field to jointly carry the second identification information is not limited to the RP object field. Alternatively, another existing or newly added field may be used. This is not limited in this application. Moreover, that the R flag is set to 0, and the network device stores the entry information of the second next hop into the local next hop table, as listed herein, should not constitute any limitation on this application either. This embodiment of this application does not exclude a possibility that the network device stores the entry information of the second next hop when the R flag is set to 1 or another value.

In the foregoing two implementations of carrying the attribute information of the next hop, specific content or values of TLV may be set based on specific conditions of the messages, and may be set in a same manner, or may be set in different manners. This is not limited in this application. In a specific embodiment, for example, the T field being 1 may identify an available bandwidth type, the L field has two bytes, and the V field is a specific available bandwidth value, for example, 20,000 kbit/sec. For another example, the T field being 2 may identify a load balancing ratio type, the L field has two bytes, and the V field is a specific load balancing ratio, for example, 50%, indicating that the next hop participates in 50% load sharing.

It should be understood that, the foregoing next hop attribute information types are only for an illustrative purpose, and should not constitute any limitation on this application. A field used to carry the attribute information of the next hop is not limited to the Next Hop Attribute field or the Next Hop Attribute object field. Alternatively, another existing or newly added field may be used. This is not limited in this application. Moreover, that the Type1 type is the available bandwidth type and the Type2 type is the load balancing ratio type, as listed herein, should not constitute any limitation on this application either. This embodiment of this application does not exclude a possibility that Type1 and Type2 are used to indicate other types, or another manner is used to indicate the available bandwidth type and the load balancing ratio type. Moreover, a quantity of next hop attribute information types is not limited in this embodiment of this application either.

Step S208. The controller sends the second message to the network device.

Further, the controller sends the second message to the network device such that the network device stores the entry information of the second next hop into the next hop table of the network device based on the second identification information.

Optionally, a next hop table is stored in the controller. After determining the entry information of the second next hop, the controller stores the entry information of the second next hop in the next hop table stored in the controller.

Step S209. The network device receives the second message.

Step S210. The network device stores the entry information of the second next hop into the local next hop table.

In a specific implementation, that the network device stores the entry information of the second next hop into the next hop table includes after receiving the second message, the network device searches, for an entry using the address of the second next hop that is carried in the second message as a keyword, the next hop table stored in the network device, and if a corresponding entry is hit, updates the found entry using the entry information of the second next hop, or if no corresponding entry is hit, creates a new next hop entry, and stores the entry information of the second next hop in the newly created next hop entry.

It should be noted that, when the second message does not carry the attribute information of the second next hop, the network device may perform processing using default values according to an existing rule, for example, not limit bandwidth of the next hop, not set a load balancing ratio of the next hop, or not specify an access type of the next hop.

According to the technical solutions provided in this embodiment, the controller may separately send information about the next hop to the network device, and implement separate management on the information about the next hop of the network device. The separate management includes separately creating or updating information about a next hop, without bundling a route prefix. According to the foregoing solutions, next hop management by the controller on the network device is more flexible, and a system resource occupied for carrying the route prefix is effectively saved when information is exchanged between the controller and the network device. Information that the network device needs to parse is reduced such that service processing efficiency of the network device is improved.

Further, when the controller separately sends the information about the next hop to the network device, the controller-customized attribute information of the next hop is carried such that the network device may obtain the attribute information of the next hop in the next hop table, and send the attribute information of the next hop to an FIB to direct packet forwarding.

Optionally, the method 200 may further include steps S211 to S215.

Step S211. The controller determines CRP routing entry information, where the CRP routing entry information includes a mapping relationship between a route prefix and an address of a third next hop.

It should be noted that, the third next hop and the first next hop may be a same next hop, the third next hop and the second next hop may be a same next hop, the first next hop, the second next hop, and the third next hop may be a same next hop, or the first next hop, the second next hop, and the third next hop are three different next hops.

The "CRP" in this application is a protocol that is run between the controller and the network device and that supports the controller to advertise a route to the network device. Based on the CRP protocol, the network device stores the route generated and advertised by the controller into a routing table separately maintained by the network device. The routing table is referred to as a "CRP routing table". The CRP protocol may be an extended protocol formed by extending an existing routing protocol, for example, a BGP extended protocol formed by extending the existing routing protocol BGP, or an extended PCEP protocol formed by extending the existing PCEP protocol such that the route sent by the controller to the network device may be carried. Alternatively, the CRP protocol may be an extension of a newly created routing protocol used between conventional network devices. Alternatively, the CRP protocol may be a newly created protocol dedicated for interaction between the controller and a conventional network device and carrying routing information sent by the controller. A specific protocol for carrying the route advertised by the controller is not limited in this application. In addition, the conventional network device in this embodiment of this application may be understood as a non-pure or hybrid SDN network device, for example, a network device that has control and forwarding functions of a conventional network device, and has a function of forwarding according to a route advertised by a controller in an SDN scenario in which control is separated from forwarding. In addition, the CRP routing table may be understood as a routing table used to store the route advertised by the controller, to distinguish from a routing table in another form, for example, a routing table used to store a route advertised between network devices. When the CRP routing entry information is carried using an extended protocol, for example, carried using the extended BGP protocol, the network device stores the CRP routing table for storing the route advertised by the controller and a BGP routing table for storing a common BGP route (for example, the route advertised between the network devices). The CRP routing table includes a plurality of routing entries referred to as "CRP routing entries". Routing information included in each CRP routing entry is referred to as CRP routing entry information. The route advertised by the controller to the network device is referred to as a "CRP route".

For example, the CRP routing table may be shown in Table 3:

TABLE 3

| Network | Next-Hop | Status | Preference | Topology | Band Width | Another field |
|---|---|---|---|---|---|---|
| 1.1.1.0/24 | 1.1.1.1 | 0x80000000 | 1 | 1 | | |
| 1.1.1.2/32 | 1.1.1.1 | 0x80000000 | 1 | 2 | | |
| 2.2.2.0/24 | 2.2.2.2 | 0x80000000 | 3 | | | |
| 2.2.2.2/32 | 2.2.2.2 | 0x80000000 | 3 | | | |
| 5.1.1.0/24 | 1.1.1.1 | 0xD0000000 | 1 | | | |
| 6.1.1.0/24 | 2.2.2.2 | 0xD0000000 | 3 | | | |
| 100.1.1.0/24 | 1.1.1.1 | 0xC0000000 | 1 | | | |

As shown in Table 3, the CRP routing table includes a plurality of CRP routing entries. Fields in the CRP routing table 1 are explained as follows:

Network field: indicates a route prefix. Usually, a destination address/mask (destination/Mask) is used for indication. If a natural mask is used, the mask may be omitted.

Next-Hop field: indicates an address of a next hop.

Status field: indicates a status of a route.

Preference field: indicates a route priority. The route priority is used to indicate a priority at which the CRP route is used to direct packet forwarding. A smaller route priority value indicates a higher route priority. Topology field: indicates a topology identifier of the network device. When a corresponding topology identifier is specified, a corresponding topology is used according to information about the specified identifier. When no specific identifier is specified, a default global topology is used.

Band Width field: indicates available bandwidth of the next hop.

When the controller advertises a CRP route to the network device, each piece of CRP routing entry information needs to include at least a mapping relationship between a route prefix and an address of a next hop, and information included in another field is optional information to be carried, and may be configured by default. After receiving a packet, the network device may forward the packet to a next hop network device as indicated by the CRP routing table.

In a specific implementation, the "Status" field may include 32 bits, and each bit represents one state of a route. For example, an encapsulation format of the "Status" field is shown in Table 4:

TABLE 4

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| V | B | A | D | | | | | | | | | | | | |

V, namely, Valid: 1 indicates a valid route, while 0 indicates an invalid route.
B, namely, Best: 1 indicates an optimal route, while 0 indicates a non-optimal route.
A, namely, Active: 1 indicates an active route, while 0 indicates an inactive route.
D, namely, Download to FIB: 1 indicates that a route is sent to the FIB, while 0 indicates that the route is not sent to the FIB.

"Status" coding is illustrated as follows:

0x80000000: Only a V bit is 1, indicating that a route is a valid route, a non-optimal route, an inactive route, and is not sent to the FIB.

0xD0000000: V, B, and D bits are 1, and an A bit is 0, indicating that the route is valid, optimal, and is sent to the FIB, but the route is not activated.

In this application, how to use the Status field in the CRP routing table is described using the foregoing four bits as an example. A person skilled in the art may understand that, 0 and 1 of the four bits may alternatively indicate opposite meanings, for example:

V, namely, Valid: 0 indicates a valid route, while 1 indicates an invalid route.

B, namely, Best: 0 indicates an optimal route, while 1 indicates a non-optimal route.

A, namely, Active: 0 indicates an active route, while 1 indicates an inactive route.

D, namely, Download to FIB: 0 indicates that a route is sent to the forwarding information base, while 1 indicates that the route is not sent to the FIB.

Alternatively, another value may be used to indicate the foregoing status information. This is not limited in this embodiment of this application.

A person skilled in the art may understand that, the Status field may alternatively be encapsulated in another encapsulation format, and this is only for an illustrative purpose, and should not be construed as any limitation on this application.

It should be understood that, a plurality of pieces of information listed in Table 3 are only examples, and do not constitute any limitation on this application. In addition, although the plurality of pieces of information are listed in Table 3, a person skilled in the art may understand that, the CRP routing entry information does not need to include all the information. Alternatively, the CRP routing entry information may include information indicated by another field that is not listed herein. This is not limited in this embodiment of this application.

The controller calculates the CRP route and determines the CRP routing entry information by collecting network element resource information and network topology information of network devices. The network element resource information includes but is not limited to label information, interface resource information, VLAN information, and a tunnel identifier (also referred to as ID). The network topology information is information describing connection relationships between a node and a link and between nodes in a network. The controller may obtain topology information of the entire network based on existing topology collection protocols such as the IGP, the ISIS protocol, and the OSPF protocol. The network topology information includes, but is not limited to, information about a path between network devices in an SDN. Optionally, the network topology information further includes weight information of the path between the network devices, and the like.

Step S212. The controller generates a third message to advertise a CRP route.

Further, the controller generates the third message. The third message carries the CRP routing entry information and is used to advertise the CRP route. The third message includes third identification information. The third identification information is used to instruct the network device to store the CRP routing entry information into the CRP routing table of the network device.

Further, the network device may be a routing and forwarding device such as a conventional router or switch in a conventional PCE network, or may be a routing and forwarding device such as a router or a switch in an SDN based on that control is separated from forwarding. The network device may be any one of R1 to R5 shown in FIG. 1. This is not limited in this embodiment of this application.

In a specific implementation, the third message may be a third BGP update message. The third BGP update message includes an MP_REACH_NLRI attribute field. The MP_REACH_NLRI attribute field includes an SAFI field, an NLRI field, and a next hop information field. The SAFI field indicates that the MP_REACH_NLRI attribute field is encapsulated in an encapsulation format supported by a BGP synchronization address family, and carries the third identification information. The NLRI field carries the route prefix. The next hop information field carries an address of the third next hop.

The third identification information is directly indicated by an SAFI value in the BGP synchronization address family SAFI field.

In this embodiment of this application, a BGP synchronization address family may be newly added in an existing BGP address family, and the CRP routing entry information is encapsulated in an encapsulation format supported by the newly added BGP synchronization address family. Further, the encapsulation format of MP_REACH_NLRI that is supported by in the BGP synchronization address family is shown in FIG. 7. For descriptions of fields in MP_REACH_NLRI, refer to the foregoing description of MP_REACH_NLRI made with reference to FIG. 7. For brevity, details are not described herein again.

In an optional implementation, that the NLRI field carries the route prefix includes that the NLRI field includes a TLV field, a type T field of the TLV field indicates that a type of the TLV field is a BGP synchronization type, and a value V field of the TLV field carries the route prefix. In the TLV field included in the NLRI field, for example, the T field value being 2 may identify a BGP route synchronization type. Optionally, a value of an L field has 16 bits, namely, two bytes, and the V field is a route prefix of a length indicated by the value of the L field. The BGP synchronization type includes a BGP route synchronization type.

It should be understood that the Type2 type is the BGP route synchronization type, as listed herein, is only for an illustrative purpose, and should not constitute any limitation on this application. This embodiment of this application does not exclude a possibility that Type2 is used to indicate another type, or another manner is used to indicate the BGP route synchronization type. Moreover, a quantity of types in NLRI Type is not limited in this embodiment of this application either.

In another specific implementation, the third message is a third PCEP message Message. The third PCEP message includes a Message-Type field, a Route object field, and a Next Hop object field. The Message-Type field indicates that the third PCEP message is used to advertise the CRP route to the network device, and is used to carry the third identification information. The Route object field carries the route prefix. The Next Hop object field carries the address of the third next hop.

The third identification information may be directly indicated by a Message-Type value in the Message-Type field.

In this embodiment of this application, a message type may be newly added in existing Message-Type to indicate the third PCEP message. In this embodiment of this application, the third PCEP message may also be referred to as a PCE-initiated route message PCE-initiated Route Message. The third PCEP message includes a common message header, the route object, and the next hop object.

For descriptions of the common message header and the next hop object in the third PCEP message, respectively refer to the foregoing description of the common message header made with reference to FIG. 5 and the foregoing related description of the next hop object made with reference to FIG. 6. Details are not described herein again.

Figure 9:
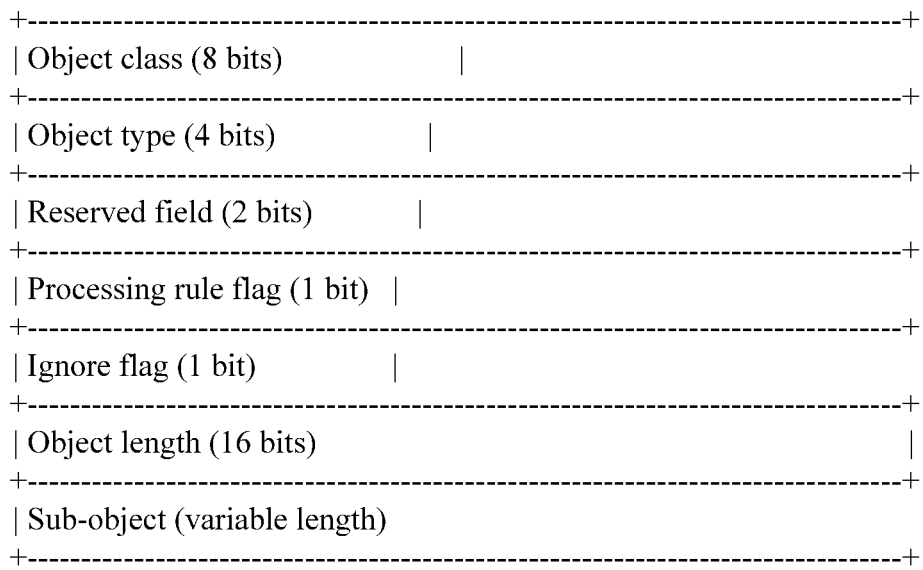
FIG. 9 is a schematic diagram of an encapsulation format of a Route object in a PCEP message according to an embodiment of this application.

For example, an encapsulation format of the Route object is shown in FIG. 9.

Fields of the Route object are explained as follows.

An Object class (8 bits) value is to be defined, and is managed by the IANA. An Object type (4 bits) value is 1. The Route object is uniquely determined by Object class and Object type. A reserved field (2 bits) is filled with 0 on transmission, and is ignored on receipt.

A Processing rule flag (1 bit) field and an Ignore flag (1 bit) field are not used in this Route object, and are set to 0.

An Object length (16 bit) value is a length, including a length of an object header, of the Route object.

The Route object includes one or more Sub-objects. The Sub-object has a variable length, and the length of the Sub-object field is determined by a length indicated by the object length field.

Figure 10:
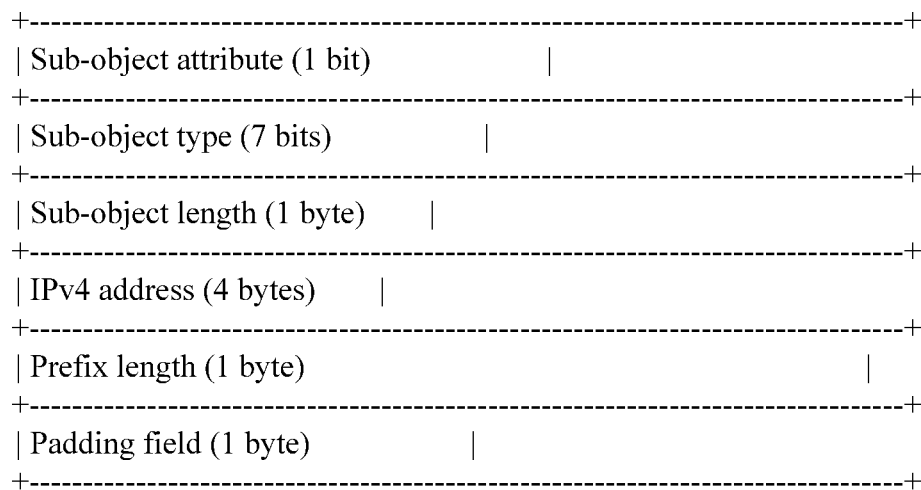
FIG. 10 is a schematic diagram of an encapsulation format of a Sub-object in a Route object according to an embodiment of this application.

In a specific implementation, the Sub-object in the Route object is an IPv4 prefix sub-object carrying an IPv4 address prefix, and may be encapsulated, for example, in an encapsulation format shown in FIG. 10.

Fields of the IPv4 prefix sub-object are explained as follows:

Sub-object attribute (L) field: in the Route object, the L bit is not used yet, and is set to 0.

Sub-object type field: a value of 0x01 indicates an IPv4 address type. The Type value is only for an illustrative purpose, and is not limited.

Sub-object length field: indicates a length of the sub-object.

IPv4 address field: indicates an IPv4 address. This address is considered as a prefix based on the following prefix length. A bit beyond the prefix is ignored on receipt, and is set to 0 on transmission.

Prefix length field: indicates a length of the IPv4 prefix.

Padding field: is set to 0 on transmission, and is ignored on receipt.

Content of an IPv4 prefix sub-object is a four-byte IPv4 address, a one-byte prefix length field, and a one-byte padding field. Abstract nodes indicated by this sub-object are a series of nodes having a same IP address prefix. The prefix length being 32 indicates a single IPv4 node.

Figure 11:
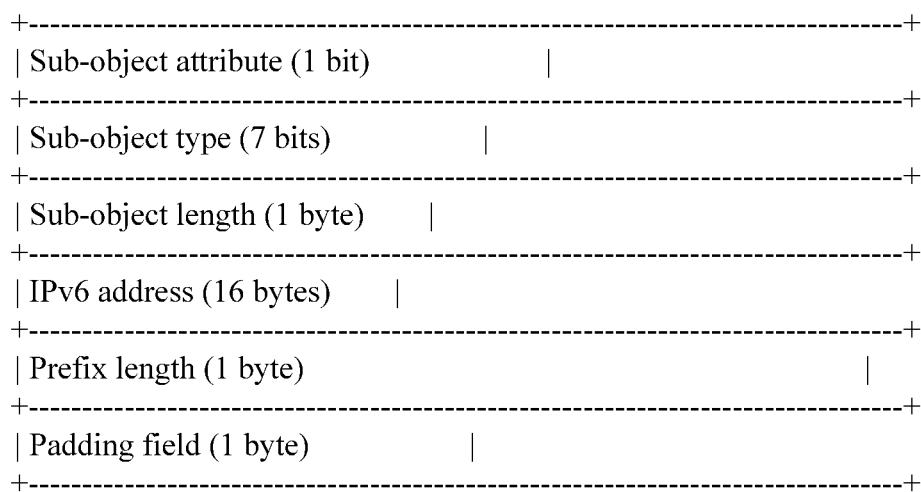
FIG. 11 is a schematic diagram of an encapsulation format of a Sub-object in a Route object according to another embodiment of this application.

In another specific implementation, the Sub-object in the Route object is an IPv6 prefix sub-object carrying an IPv6 address prefix, and may be encapsulated, for example, in an encapsulation format shown in FIG. 11, as shown in FIG. 11:

Fields of the IPv6 prefix sub-object are explained as follows:

Sub-object attribute (L) field: in the Route object, the L bit is not used yet, and is set to 0.

Sub-object type field: a value of 0x02 indicates an IPv6 address type.

Sub-object length field: indicates a length of the sub-object.

IPv6 address field: indicates an IPv6 address. This address is considered as a prefix based on the following prefix length. A bit beyond the prefix is ignored on receipt, and is set to 0 on transmission.

Prefix length field: indicates a length of the IPv6 prefix.

Padding field: is set to 0 on transmission, and is ignored on receipt.

Content of an IPv6 prefix sub-object is a 16-byte IPv6 address, a one-byte prefix length field, and a one-byte padding field. Abstract nodes indicated by this sub-object are a series of nodes belonging to a same IP address prefix. A prefix length value 128 indicates a single IPv6 node.

It should be understood that, values and/or lengths of the fields listed herein are only for an illustrative purpose, and should not constitute any limitation on this application. This embodiment of this application does not exclude a possibility that the value of the Object-Type field is another value.

It should be understood that, the encapsulation formats of the Route object listed herein are only for an illustrative purpose, and an encapsulation format of the Route object and a value of a related field in the Route object are not further limited in this embodiment of this application. This embodiment of this application does not exclude a possibility that the Route object is encapsulated in another encapsulation format.

Step S213. The controller sends the third message to the network device.

Further, the controller sends the third message to the network device such that the network device stores the CRP routing entry information into the CRP routing table of the network device based on the third identification information, and directs packet forwarding based on the CRP routing table.

Optionally, a CRP routing table is stored in the controller. After determining the CRP routing entry information, the controller stores the CRP routing entry information in the CRP routing table stored in the controller.

Step S214. The network device receives the third message.

Step S215. The network device stores CRP routing entry information into a CRP routing table of the network device.

Further, after receiving the third message and identifying, based on the third identification information carried in the third message, that the CRP routing entry information carried in the third message needs to be stored in the CRP routing table of the network device, the network device stores the CRP routing entry information into the CRP routing table of the network device, and then may direct packet forwarding based on the CRP routing table.

In a specific implementation, after receiving the third message, the network device searches the CRP routing table for an entry using the route prefix carried in the third message as a keyword, and if a corresponding entry is hit, updates corresponding information in the found entry using the CRP routing entry information, or if no corresponding entry is hit, creates a CRP routing entry, and stores the CRP routing entry information in the newly created CRP routing entry.

According to the foregoing technical solutions, by running the CRP protocol between the controller and the forwarding device, the separate CRP routing table is created on the forwarding device, to store the CRP routing entry information sent by the controller. A preferred route in the CRP routing table is added to a routing management (RM) routing information base (RIB) of an RM module such that an RM module may select a route among routes generated using different routing protocols, such as the CRP route, an ISIS route, a BGP route, and an OSPF route. Moreover, because the CRP route advertised by the controller and a route that is advertised in a routing protocol between forwarding devices are stored in different routing tables, a routing policy related to the CRP route does not affect a related application of a routing policy embodied by the route that is advertised in the routing protocol between the forwarding devices.

Optionally, the CRP routing entry information further includes route synchronization attribute information. The route synchronization attribute information is used to carry route attribute information defined by the controller when the controller sends the route prefix.

The route synchronization attribute information includes but is not limited to the route priority, the topology, and the attribute information of the next hop.

The attribute information of the next hop includes at least one next hop attribute information type. The next hop attribute information type includes but is not limited to an access type of the next hop, such as an IP network or a VXLAN, available bandwidth, a load balancing ratio (Weight), and the like.

In a specific implementation, in the foregoing embodiment in which the BGP update message is used to carry the CRP routing entry information, the third BGP update message further includes a Route Synchronization Attribute field. The Route Synchronization Attribute field carries the route synchronization attribute information. Optionally, the Route Synchronization Attribute field includes at least one sub-TLV field. Each route synchronization attribute information type corresponds to one of the at least one sub-TLV field. Each sub-TLV field includes a T field, an L field, and a V field. The T field indicates any one of the route synchronization attribute information types. The V field indicates content determined based on the corresponding route synchronization attribute information type. The route synchronization attribute information types include the route priority.

In another specific implementation, in the foregoing embodiment in which the PCEP message is used to carry the CRP routing entry information, the third PCEP message further includes a PCEP route attribute object Route Attribute object field. The PCEP Route Attribute object field carries the route synchronization attribute information. Optionally, the PCEP Route Attribute object field includes at least one sub-TLV field. Each route synchronization attribute information type corresponds to one of the at least one sub-TLV field. Each sub-TLV field includes a T field, an L field, and a V field. The T field indicates any one of the route synchronization attribute information types. The V field indicates content determined based on the corresponding route synchronization attribute information type. The route synchronization attribute information types include the route priority.

In the foregoing two implementations of carrying the route synchronization attribute information, specific content or values of TLV may be set based on specific conditions of the messages, and may be set in a same manner, or may be set in different manners. This is not limited in this application.

In a specific embodiment, for example, the T field being 1 may identify a route priority type, the L field has two bytes, and the V field is a specific route priority value, for example, 3. For another example, the T field being 2 may identify a topology type, the L field has two bytes, and the V field is a specific topology identifier, for example, 1. The T field being 3 may identify a next hop available bandwidth type, the L field has two bytes, and the V field is a specific available bandwidth value, for example, 20,000 kbit/sec. For still another example, the T field being 4 may identify a next hop load balancing ratio type, the L field has two bytes, and the V field is a specific load balancing ratio, for example, 50%, indicating that the next hop participates in 50% load sharing.

It should be understood that, the foregoing route synchronization attribute information types are only for an illustrative purpose, and should not constitute any limitation on this application. A field used to carry the route synchronization attribute information is not limited to the Route Synchronization Attribute field or the Route Attribute object field. Alternatively, another existing or newly added field may be used. This is not limited in this application. Moreover, that the Type1 type is the route priority type, the Type2 type is the topology type, Type3 is the next hop available bandwidth type, and Type4 is the next hop load balancing ratio type, as listed herein, should not constitute any limitation on this application either. This embodiment of this application does not exclude a possibility that Type1 to Type4 are used to indicate other types, or another manner is used to indicate the route priority type, the topology type, the next hop available bandwidth type, and the next hop load balancing ratio type. Moreover, a quantity of route synchronization attribute information types is not limited in this embodiment of this application either.

Optionally, in this application, alternatively, a next hop attribute field may be separately used to carry the attribute information of the next hop.

In a specific implementation, in the foregoing embodiment in which the BGP update message is used to carry the CRP routing entry information, the third BGP update message further includes a next hop synchronization attribute Next Hop Synchronization Attribute field. The Next Hop Attribute field carries the attribute information of the third next hop. Optionally, the Next Hop Synchronization Attribute field includes at least one sub-TLV field. Each next hop attribute information type corresponds to one of the at least one sub-TLV field. Each sub-TLV field includes a T field, an L field, and a V field. The T field indicates any one of the next hop attribute information types. The V field indicates content determined based on the corresponding next hop attribute information type.

In another specific implementation, in the foregoing embodiment in which the PCEP message is used to carry the CRP routing entry information, the third PCEP message further includes a PCEP next hop attribute object Next Hop Attribute object field. The PCEP Next Hop Attribute object field carries the attribute information of the third next hop. Optionally, the PCEP Next Hop Attribute object field includes at least one sub-TLV field. Each next hop attribute information type corresponds to one of the at least one sub-TLV field. Each sub-TLV field includes a T field, an L field, and a V field. The T field indicates any one of the next hop attribute information types. The V field indicates content determined based on the corresponding next hop attribute information type.

In the foregoing two implementations of separately using a next hop attribute field to carry the attribute information of the next hop, specific content or values of TLV may be set based on specific conditions of the messages, and may be set in a same manner, or may be set in different manners. This is not limited in this application. In this embodiment of this application, for example, the T field being 1 may identify an available bandwidth type, the L field has two bytes, and the V field is a specific available bandwidth value, for example, 20,000 kbit/sec. For another example, the T field being 2 may identify a load balancing ratio type, the L field has two bytes, and the V field is a specific load balancing ratio, for example, 50%, indicating that the next hop participates in 50% load sharing.

It should be understood that, the foregoing next hop attribute information types are only for an illustrative purpose, and should not constitute any limitation on this application. A field used to carry the attribute information of the next hop is not limited to the Next Hop Synchronization Attribute field or the Next Hop Attribute object field. Alternatively, another existing or newly added field may be used. This is not limited in this application. Moreover, that the Type1 type is the available bandwidth type and the Type2 type is the load balancing ratio type, as listed herein, should not constitute any limitation on this application either. This embodiment of this application does not exclude a possibility that Type1 and Type2 are used to indicate other types, or another manner is used to indicate the available bandwidth type and the load balancing type. Moreover, a quantity of types in Next Hop Synchronization Attribute is not limited in this embodiment of this application either.

In this application, the route priority is carried in the CRP routing entry information such that the priority of the CRP route can be flexibly set. For example, the CRP route is set to a preferred route such that the route advertised by the controller is used to control traffic. Subsequent various complex policy control for routing may be completed by upgrading the controller. This is unlike an existing routing policy, for example, a BGP routing policy, in which all devices need to implement a complex policy. Therefore, traffic control is simpler and more flexible. In addition, in some application scenarios, a customer considers that an internally deployed IGP route is trusted and should be preferentially selected, while an external route is untrusted and should not be preferentially selected, and then the priority of the CRP route may be set to be lower than priorities of the ISIS route and the OSPF route. Therefore, it can be learned that different requirements of the customer may be met by setting the priority of the CRP route.

Further, the attribute information of the next hop is carried in the CRP routing entry information such that the network device may obtain the attribute information of the next hop in the CRP routing table, and send the attribute information of the next hop to the FIB to direct packet forwarding.

It should be noted that, when the CRP routing entry information includes the route synchronization attribute information, after receiving the third message, the network device stores the route synchronization attribute information in the CRP routing table as indicated by the third identification information. Further, when receiving the third message, the network device searches the CRP routing table using the route prefix carried in the third message as a key value, and if a corresponding entry is hit, updates corresponding information in the hit entry using the route synchronization attribute information, or if no corresponding entry is hit, creates a new entry, and stores the route synchronization attribute information in the new entry.

Further, after receiving the third message, the network device stores the attribute information of the third next hop in the local next hop table as indicated by the third identification information. Further, in addition to storing the attribute information of the third next hop in the CRP routing table, the network device further searches, using the address of the third next hop that is carried in the third message as a key value, the next hop table maintained by the network device, and if a corresponding entry is hit, updates corresponding information in the found entry using the attribute information of the third next hop, or if no corresponding entry is hit, creates a new entry, to store the address of the third next hop and the attribute information of the third next hop.

It should be noted that, when the third message does not carry the route synchronization attribute information, the network device may perform processing using default values according to an existing rule, for example, set an inter-protocol route selection priority to 1, not limit bandwidth of the next hop, not set a load balancing ratio of the next hop, or not specify a type of the next hop.

Optionally, the method 200 may further include steps S216 to S218.

Step S216. The network device generates a fourth message.

The fourth message carries route status report information. The route status report information includes a mapping relationship between the route prefix and status information of the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop. Alternatively, next-hop-related status information (such as a status of a next hop, for example, whether a next hop is valid or whether a next hop is already in use, a bandwidth occupation ratio of a next hop, a packet loss rate of a next hop, a packet sending delay of a next hop, and a survival time of a next hop) may be carried in next hop status report information described in the following step 219. For details, refer to the following description.

In a specific implementation, the fourth message is a fourth BGP update message. The fourth BGP update message includes an MP_REACH_NLRI attribute field and a route status report attribute Route Status Report Attribute field. The MP_REACH_NLRI attribute field includes an NLRI field. The NLRI field is used to carry the route prefix. The Route Status Report Attribute field is used to carry the status information of the CRP route. Optionally, the Route Status Report Attribute field includes at least one sub-TLV field. Each CRP route status information type corresponds to the at least one sub-TLV field. Each sub-TLV field includes a T field, an L field, and a V field. The T field indicates any one of the CRP route status information types. The V field indicates content determined based on the corresponding CRP route status information type.

In another specific implementation, the fourth message is a fourth PCEP message. The fourth PCEP message includes a message type Message-Type field, a route object Route object field, and a route status report attribute object Route Status Report Attribute object field. The Message-Type field indicates that the fourth PCEP message is used to send the route status report information to the controller. The Route object field carries the route prefix. The Route Status Report Attribute object field carries the status information of the CRP route. Optionally, the Route Status Report Attribute object field includes at least one sub-TLV field. Each CRP route status information type corresponds to the at least one sub-TLV field. Each sub-TLV field includes a T field, an L field, and a V field. The T field indicates any one of the CRP route status information types. The V field indicates content determined based on the corresponding CRP route status information type.

In this embodiment of this application, for example, the T field being 1 may identify a current route status Status type of the CRP route, the L field has two bytes, and the V field indicates specific content of a current route status Status of the CRP route, for example, whether the current route is valid, whether the current route is preferentially selected, or whether the current route is activated.

It should be understood that the Type1 type is the current route status type of the CRP route, as listed herein, is only for an illustrative purpose, and should not constitute any limitation on this application. This embodiment of this application does not exclude a possibility that Type1 is used to indicate another type, or another manner is used to indicate the current route status type of the CRP route. Moreover, a quantity of types in TLV Type is not limited in this embodiment of this application either.

In a specific implementation, the network device locally stores a route status report information table, which is used to store the route status report information. For example, the route status report information table is shown in Table 5:

TABLE 5

| Network | Next-Hop | Status | Age | Band Width | (Another field) |
|---|---|---|---|---|---|
| 1.1.1.0/24 | 1.1.1.1 | 0x80000000 | 00:17:49 | | |
| 1.1.1.2/32 | 1.1.1.1 | 0x80000000 | 00:17:49 | | |
| 2.2.2.0/24 | 2.2.2.2 | 0x80000000 | 00:00:07 | | |
| 2.2.2.2/32 | 2.2.2.2 | 0x80000000 | 00:00:07 | | |
| 5.1.1.0/24 | 1.1.1.1 | 0xD0000000 | 00:17:49 | | |
| 6.1.1.0/24 | 2.2.2.2 | 0xD0000000 | 00:00:07 | | |
| 100.1.1.0/24 | 1.1.1.1 | 0xC0000000 | 00:17:49 | | |

As shown in Table 5, the route status report information table includes a plurality of fields. The fields are explained as follows:

Network field: indicates the route prefix.

Next-Hop field: indicates an address of a next hop.

Status field: indicates a status of a route.

Age field: indicates a survival time of the current route.

Band Width field: indicates available bandwidth of the next hop.

For an encapsulation format and a related description of the Status field, refer to Table 4 and the related description of Table 4. Details are not described herein again.

It should be understood that, a plurality of pieces of status information listed in Table 5 are only examples, and do not constitute any limitation on this application. In addition, although the plurality of pieces of status information are listed in Table 5, a person skilled in the art may understand that, the route status report information may include one or more of the plurality of pieces of status information instead of all the status information. Alternatively, the route status report information may include only status information indicated by another field that is not listed herein. This is not limited in this embodiment of this application.

Step S217. The network device sends the fourth message to the controller.

In a specific implementation, the network device periodically reports the status information of the CRP route. For example, when a system runs stably, the network device reports the status information of the route such as traffic statistics and bandwidth use to the controller once every 180 seconds through configuration or negotiation.

In another specific implementation, the network device reports the status information of the route in real time. For example, when an important event occurs in the system, for example, an entry corresponding to routing information is changed from "preferred" to "not preferred", or a routing entry iteration tunnel fails, the network device reports the status information of the route to the controller.

Step S218. The controller receives the fourth message.

The controller updates statistical information of the route prefix based on the received route status report information, to use updated statistical information as a basis for re-calculating the CRP route.

According to the foregoing technical solutions, the controller may obtain, periodically or in real time, route status information reported by a forwarding device, to learn a status of the forwarding device in real time, and use the route status information as a basis for adjusting a route, thereby improving traffic control reliability and real-time quality.

Optionally, the method 200 may further include steps S219 to S221.

Step S219. The network device generates a fifth message.

The fifth message carries next hop status report information. The next hop status report information includes a mapping relationship between an address of a fourth next hop of the network device and status information of the fourth next hop.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

It should be noted that, the fourth next hop and the third next hop may be a same next hop, or the fourth next hop and the first next hop may be a same next hop, or the fourth next hop and the second next hop may be a same next hop, or the fourth next hop, the third next hop, the second next hop, and the first next hop may be a same next hop, or the fourth next hop, the third next hop, the second next hop, and the first next hop may be different next hops.

In a specific implementation, the fifth message is a fifth BGP update message. The fifth BGP update message includes an MP_REACH_NLRI attribute field and a Next Hop Status Report Attribute field. The MP_REACH_NLRI attribute field includes an NLRI field. The NLRI field is used to carry the address of the fourth next hop. The Next Hop Status Report Attribute field is used to carry the status information of the fourth next hop. Optionally, the Next Hop Status Report Attribute field includes at least one sub-TLV field. Each next hop status information type corresponds to one of the at least one sub-TLV field. Each sub-TLV field includes a T field, an L field, and a V field. The T field indicates any one of the next hop status information types. The V field indicates content determined based on the corresponding next hop status information type.

In another specific implementation, the fifth message is a fifth PCEP message. The fifth PCEP message includes a Message-Type field, a Next Hop object field, and a Next Hop Status Report Attribute object field. The Message-Type field indicates that the fifth PCEP message is used to send the next hop status report information to the controller. The Next Hop object field carries the address of the fourth next hop. The Next Hop Status Report Attribute object field carries the status information of the fourth next hop. Optionally, the Next Hop Status Report Attribute object field includes at least one sub-TLV field. Each next hop status information type corresponds to one of the at least one sub-TLV field. Each sub-TLV field includes a T field, an L field, and a V field. The T field indicates any one of the next hop status information types. The V field indicates content determined based on the corresponding next hop status information type.

In this embodiment of this application, for example, the T field being 1 may identify a current status type of the next hop, the L field has two bytes, and the V field indicates specific content of a status of the next hop, for example, whether the current route is valid, whether the current route is preferentially selected, or whether the current route is activated.

It should be understood that the Type1 type is the current status type of the next hop, as listed herein, is only for an illustrative purpose, and should not constitute any limitation on this application. This embodiment of this application does not exclude a possibility that Type1 is used to indicate another type, or another manner is used to indicate the current status type of the next hop. Moreover, a quantity of types in TLV Type is not limited in this embodiment of this application either.

In another specific implementation, the network device locally stores a next hop status report information table, which is used to store the next hop status report information. For example, the next hop status report information table is shown in Table 6:

TABLE 6

| Next-Hop | Type | Status | Age | Band Width Ratio | Loss (packet) | Delay | ... (Another field) |
|---|---|---|---|---|---|---|---|
| 1.1.1.1 | IP | 0xC0000000 | 00:17:49 | 45 | 10 | 15 | |
| 2.2.2.2 | GRE | 0xC0000000 | 00:00:07 | 60 | 0 | 20 | |

As shown in Table 6, the next hop status report information table includes a plurality of fields. The fields are explained as follows:

Next-Hop field: indicates an address of a next hop.
Type field: indicates a type of the next hop.
Status field: indicates a status of the next hop.
Band Width field: indicates available bandwidth of the next hop.
Weight field: indicates a load balancing ratio of the next hop.
Loss field: indicates a quantity of lost packets.
Delay field: indicates a delay, in units of microseconds.

For an encapsulation format and a related description of the Status field, refer to Table 2 and the related description of Table 2. Details are not described herein again.

It should be understood that, a plurality of pieces of status information listed in Table 6 are only examples, and do not constitute any limitation on this application. In addition, although the plurality of pieces of status information are listed in Table 6, a person skilled in the art may understand that, the next hop status report information may include one or more of the plurality of pieces of status information instead of all the status information. Alternatively, the next hop status report information may include only other status information indicated by another field that is not listed herein. This is not limited in this embodiment of this application.

Step S220. The network device sends the fifth message to the controller.

In a specific implementation, the network device periodically reports the status information of the next hop. For example, when a system runs stably, the network device reports the status information of the next hop such as traffic statistics and bandwidth use to the controller once every 180 seconds through configuration or negotiation.

In another specific implementation, the network device reports the status information of the next hop in real time. For example, when an important event occurs in the system, for example, an entry corresponding to information about the next hop is changed from "reachable" to "unreachable", or a bandwidth usage ratio of an egress link corresponding to the next hop exceeds a threshold (for example, 90%), the network device reports the status information of the next hop to the controller.

Step S221. The controller receives the fifth message.

The controller updates statistical information of the next hop of the network device based on the received next hop status report information, to use updated statistical information as a basis for re-calculating the next hop.

According to the foregoing technical solutions, the controller may obtain, periodically or in real time, next hop status information reported by a forwarding device, to learn a status of the forwarding device in real time, and use the next hop status information as a basis for calculating and adjusting a next hop, thereby improving traffic control reliability and real-time quality.

It should be noted that, a sequence of performing steps S201 to S205, S206 to S210, S211 to S215, S216 to S218, and S219 to S221 is not limited in this application. For example, steps S206 to S210 may be performed before steps S201 to S205, or may be performed after steps S201 to S205. Steps S206 to S210 may be performed before steps S211 to S215, or may be performed after steps S211 to S215. Moreover, Steps S201 to S205, S206 to S210, S211 to S215, S216 to S218, and S219 to S221 all may be separately performed.

The foregoing describes, in detail with reference to FIG. 1 to FIG. 11, the information management method provided in the embodiments of this application. The following describes, in detail with reference to FIG. 12 to FIG. 15, an information management apparatus and a system that are provided in the embodiments of this application.

Figure 12:
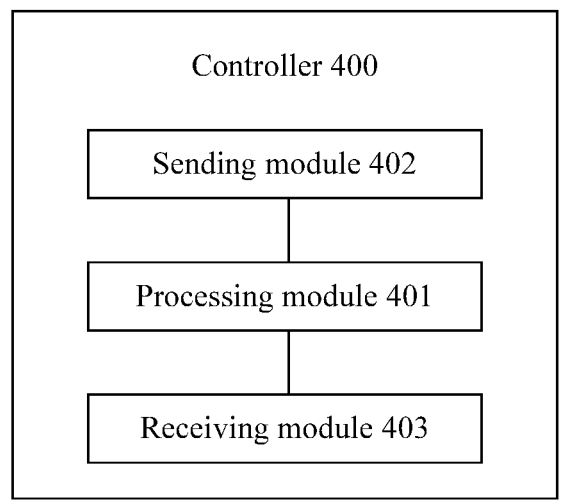
FIG. 12 is a schematic diagram of a controller according to an embodiment of this application.

FIG. 12 is a schematic diagram of a controller 400 according to an embodiment of this application. The controller 400 may be the controller 110 shown in FIG. 1 configured to perform the method shown in FIG. 2A and FIG. 2B. As shown in FIG. 12, the controller 400 includes a processing module 401 and a sending module 402.

The processing module 401 is configured to generate a first message. The first message carries an address of a first next hop of a network device. The first message includes first identification information. The first identification information is used to instruct the network device to delete, from a next hop table stored in the network device, an entry that is of the first next hop and that corresponds to the address of the first next hop.

The sending module 402 is configured to send the first message to the network device such that the network device deletes the entry of the first next hop as indicated by the first identification information.

In a specific implementation, the first message is a first BGP update message. For a message format or a field format (for example, fields or extension fields) used in the first BGP update message, refer to the description of a corresponding part in the method embodiments. Details are not described herein again.

In another specific implementation, the first message is a first PCEP message. For a message format or a field format (for example, fields or extension fields) used in the first PCEP message, refer to the description of a corresponding part in the method embodiments. Details are not described herein again.

It can be learned that, by receiving the first message that is sent by the controller and that carries the address of the first next hop, the network device deletes, from the separately stored next hop table based on the first identification information carried in the first message, the entry that is of the first next hop and that corresponds to the address of the first next hop, without a need to delete an unavailable next hop by binding the route prefix and canceling a large quantity of routing messages, thereby saving a network resource. Moreover, when a plurality of routing entries correspond to a same next hop, the plurality of routing entries using the next hop can be deleted by deleting the next hop corresponding to the plurality of routing entries. Therefore, only one message needs to be sent between the controller and the network device to rapidly delete the routing entries in batches. Accordingly, a quantity of messages exchanged between the controller and a forwarding device is greatly reduced, a system resource is saved, and service processing efficiency is improved.

Optionally, the processing module 401 is further configured to generate a second message. The second message carries entry information of a second next hop of the network device. The entry information of the second next hop includes a mapping relationship between an address of the second next hop of the network device and attribute information of the second next hop. The second message includes second identification information. The second identification information is used to instruct the network device to store the entry information of the second next hop into the next hop table of the network device.

The sending module 402 is further configured to send the second message to the network device such that the network device stores the entry information of the second next hop into the next hop table of the network device based on the second identification information.

In a specific implementation, the second message is a second BGP update message. For a message format or a field format (for example, fields or extension fields) used in the second BGP update message, refer to the description of a corresponding part in the method embodiments. Details are not described herein again.

In another specific implementation, the second message is a second PCEP message. For a message format or a field format (for example, fields or extension fields) used in the second PCEP message, refer to the description of a corresponding part in the method embodiments. Details are not described herein again.

Therefore, the controller may separately send information about the next hop to the network device, and implement separate management on the information about the next hop of the network device. The separate management includes separately creating or updating information about a next hop, without bundling a route prefix. According to the foregoing solutions, next hop management by the controller on the network device is more flexible, and a system resource occupied for carrying the route prefix is effectively saved when information is exchanged between the controller and the network device. Information that the network device needs to parse is reduced such that service processing efficiency of the network device is improved.

Further, when the controller separately sends the information about the next hop to the network device, the controller-customized attribute information of the next hop is carried such that the network device may obtain the attribute information of the next hop in the next hop table, and send the attribute information of the next hop to an FIB to direct packet forwarding.

Optionally, the processing module 401 is further configured to determine CRP routing entry information. The CRP routing entry information includes a mapping relationship between a route prefix and an address of a third next hop. The processing module 401 is further configured to generate a third message. The third message carries the CRP routing entry information and is used to advertise a CRP route. The third message includes third identification information. The third identification information is used to instruct the network device to store the CRP routing entry information into a CRP routing table of the network device.

The sending module 402 is further configured to send the third message to the network device such that the network device stores the CRP routing entry information into the CRP routing table based on the third identification information, and directs packet forwarding based on the CRP routing table.

It should be noted that, the address of the third next hop may be the same as the address of the first next hop, or may be the same as the address of the second next hop, or certainly, may be different from the address of the first next hop and the address of the second next hop.

In a specific implementation, the third message is a third BGP update message. For a message format or a field format (for example, fields or extension fields) used in the third BGP update message, refer to the description of a corresponding part in the method embodiments. Details are not described herein again.

In another specific implementation, the third message is a third PCEP message. For a message format or a field format (for example, fields or extension fields) used in the third PCEP message, refer to the description of a corresponding part in the method embodiments. Details are not described herein again.

Therefore, according to the controller in this embodiment of this application, by running the CRP protocol between the controller and the network device, the separate CRP routing table is created on the network device, to store the CRP routing entry information sent by the controller. A preferred route in the CRP routing table is added to an RIB of a RM module such that an RM module may select a route among routes generated using different routing protocols, such as the CRP route, an ISIS route, a BGP route, and an OSPF route. Moreover, because the CRP route advertised by the controller and a route that is advertised in a routing protocol between forwarding devices are stored in different routing tables, a routing policy related to the CRP route does not affect a related application of a routing policy embodied by the route that is advertised in the routing protocol between the forwarding devices.

Optionally, the CRP routing entry information further includes route synchronization attribute information. The route synchronization attribute information is used to carry route attribute information defined by the controller when the controller sends the route prefix.

The route synchronization attribute includes but is not limited to the route priority, the topology, and the attribute information of the next hop.

The attribute information of the first next hop includes one or more of the following attribute information types of a next hop, bandwidth, a load balancing ratio, and a type of the next hop.

In a specific implementation, in the foregoing embodiment in which the BGP update message is used to carry the CRP routing entry information, the third BGP update message further includes a Route Synchronization Attribute field, which is used to carry the route synchronization attribute. For a specific carrying manner, namely, a used message format, field format, and the like, refer to the description of a corresponding part in the method embodiments. Details are not described herein again.

In another specific implementation, in the foregoing embodiment in which the PCEP message is used to carry the CRP routing entry information, the third PCEP message further includes a PCEP route attribute object Route Attribute object field, which is used to carry the route synchronization attribute. For a specific carrying manner, namely, a used message format, field format, and the like, refer to the description of a corresponding part in the method embodiments. Details are not described herein again.

It should be noted that, when the third message does not carry the route synchronization attribute information, the network device may perform processing using default values according to an existing rule, for example, set an inter-protocol route selection priority to 1, not limit bandwidth of the next hop, not set a load balancing ratio of the next hop, or not specify a type of the next hop.

The route priority is carried in the route attribute information such that the priority of the CRP route can be flexibly set. For example, the CRP route is set to a preferred route such that the route advertised by the controller is used to control traffic. Subsequent various complex policy control for routing may be completed by upgrading the controller. This is unlike an existing routing policy, for example, a BGP routing policy, in which all devices need to implement a complex policy. Therefore, traffic control is simpler and more flexible. In addition, in some application scenarios, a customer considers that an internally deployed IGP route is trusted and should be preferentially selected, while an external route is untrusted and should not be preferentially selected, and then the priority of the CRP route may be set to be lower than priorities of an ISIS route and an OSPF route. Therefore, it can be learned that different requirements of the customer may be met by setting the priority of the CRP route.

Optionally, in this application, alternatively, a next hop attribute field may be separately used to carry the attribute information of the next hop.

In a specific implementation, in the foregoing embodiment in which the BGP update message is used to carry the CRP routing entry information, the third BGP update message further includes a next hop attribute Next Hop Attribute field, which is used to carry the attribute information of the next hop. For a specific carrying manner, namely, a used message format, field format, and the like, refer to the description of a corresponding part in the method embodiments. Details are not described herein again.

In another specific implementation, in the foregoing embodiment in which the PCEP message is used to carry the CRP routing entry information, the third PCEP message further includes a PCEP next hop attribute object Next Hop Attribute object field. For a specific carrying manner, namely, a used message format, field format, and the like, refer to the description of a corresponding part in the method embodiments. Details are not described herein again.

The attribute information of the next hop is carried in the CRP routing entry information such that the network device may obtain the attribute information of the next hop in the CRP routing table, and send the attribute information of the next hop to the FIB to direct packet forwarding.

In a specific implementation, the controller 400 further includes a receiving module 403. The receiving module 403 is configured to receive a fourth message sent by the network device. The fourth message carries route status report information. The route status report information includes a mapping relationship between the route prefix and status information of the CRP route.

The processing module 401 is further configured to update statistical information of the route prefix based on the received route status report information to use updated statistical information as a basis for re-calculating the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller 400 may obtain, periodically or in real time, route status information reported by the network device, to learn a route status of the network device in real time, and use the route status information as a basis for adjusting the route, thereby improving traffic control reliability and real-time quality.

Optionally, the receiving module 403 is further configured to receive a fifth message sent by the network device. The fifth message carries next hop status report information. The next hop status report information includes a mapping relationship between an address of a fourth next hop of the network device and status information of the fourth next hop.

It should be noted that, the address of the fourth next hop may be the same as the address of the first next hop, or may be the same as the address of the second next hop, or may be the same as the address of the third next hop, or certainly, may be different from the address of any one of the first next hop to the third next hop.

The processing module 401 is further configured to update statistical information of the fourth next hop based on the received next hop status report information to use updated statistical information as a basis for re-calculating a next hop of the network device.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller 400 may obtain, periodically or in real time, next hop status information reported by a forwarding device, to learn a status of the forwarding device in real time, and use the next hop status information as a basis for calculating and adjusting a next hop, thereby improving traffic control reliability and real-time quality.

The controller 400 according to this embodiment of this application may correspond to a controller in the information synchronization method 200 according to the foregoing embodiment of this application, and the modules in the controller 400 and the foregoing other operations and/or functions are respectively used to implement corresponding procedures of the method 200 in FIG. 2A and FIG. 2B. For brevity, details are not described herein again.

Figure 13:
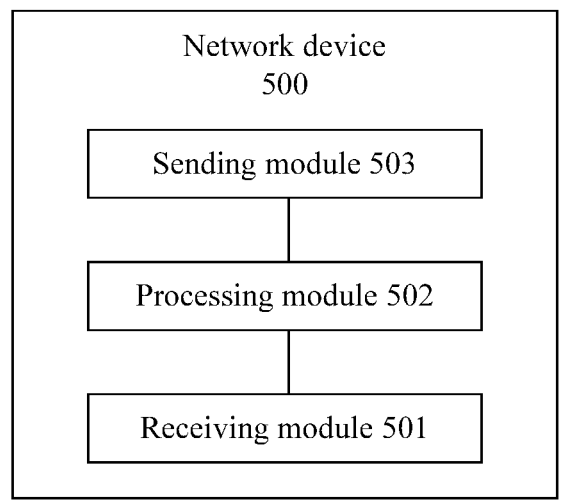
FIG. 13 is a schematic diagram of a network device according to an embodiment of this application.

FIG. 13 is a schematic diagram of a network device 500 according to an embodiment of this application. The network device 500 may be a network device 120 shown in FIG. 1, and may be configured to perform the method shown in FIG. 2A and FIG. 2B. As shown in FIG. 13, the network device 500 includes a receiving module 501 and a processing module 502.

The receiving module 501 is configured to receive a first message sent by a controller. The first message carries an address of a first next hop of the network device. The first message includes first identification information.

The processing module 502 is configured to delete, from a next hop table stored in the network device as indicated by the first identification information, an entry that is of the first next hop and that corresponds to the address of the first next hop.

Further, as indicated by the first identification information, the processing module 502 searches the next hop table using the address of the first next hop as a keyword, hits the entry of the first next hop, and deletes the entry of the first next hop.

After hitting the entry of the first next hop, and before deleting the entry of the first next hop, the processing module is further configured to notify a routing entry using the address of the first next hop that the address of the first next hop is unavailable, and delete the routing entry associated with the address of the first next hop.

Therefore, when a plurality of routing entries correspond to a same next hop, the plurality of routing entries using the next hop are automatically deleted by deleting the next hop corresponding to the plurality of routing entries. Therefore, only one message needs to be sent between the controller and the network device to rapidly delete the routing entries in batches. Accordingly, a quantity of messages exchanged between the controller and a forwarding device is greatly reduced, a system resource is saved, and service processing efficiency is improved.

Optionally, the receiving module 501 is further configured to receive a second message sent by the controller. The second message carries entry information of a second next hop of the network device. The entry information of the second next hop includes a mapping relationship between an address of the second next hop of the network device and attribute information of the second next hop. The second message includes second identification information.

The processing module 502 is further configured to store the entry information of the second next hop into the next hop table of the network device as indicated by the second identification information.

Therefore, by receiving information about the next hop that is separately sent by the controller, the network device separately creates or updates the information about the next hop, without bundling a route prefix. According to the foregoing solution, next hop management by the controller on the network device is more flexible, and a system resource occupied for carrying the route prefix is effectively saved when information is exchanged between the controller and the network device. Information that the network device needs to parse is reduced such that service processing efficiency of the network device is improved.

Optionally, the processing module 502 is further configured to search the next hop table using the address of the second next hop as a keyword to obtain the attribute information of the second next hop, and send the attribute information of the second next hop to a forwarding information base to direct packet forwarding.

Optionally, the receiving module 501 is configured to receive a third message sent by the controller. The third message carries CRP routing entry information determined by the controller and is used to advertise a CRP route. The CRP routing entry information includes a mapping relationship between a route prefix and an address of a third next hop. The third message includes third identification information.

The processing module 502 is configured to store the CRP routing entry information into a local CRP routing table as indicated by the third identification information, and direct packet forwarding based on the CRP routing table.

By running the CRP protocol between the controller and the network device, the separate CRP routing table is created on the network device, to store the CRP routing entry information sent by the controller. Because the CRP route advertised by the controller and a route that is advertised in a routing protocol between network devices are stored in different routing tables, a routing policy related to the CRP route does not affect a related application of a routing policy embodied by the route in the routing protocol between the network devices.

Optionally, the CRP routing entry information further includes route synchronization attribute information. The route synchronization attribute information is used to carry route attribute information defined by the controller when the controller sends the route prefix.

The route synchronization attribute includes but is not limited to the route priority, the topology, and the attribute information of the next hop.

The attribute information of the third next hop includes one or more of the following attribute information types of a next hop, bandwidth, a load balancing ratio, and a type of the next hop.

The route priority is carried in the CRP routing entry information such that the priority of the CRP route can be flexibly set. For example, the CRP route is set to a preferred route such that the route advertised by the controller is used to control traffic. Subsequent various complex policy control for routing may be completed by upgrading the controller. This is unlike an existing routing policy, for example, a BGP routing policy, in which all devices need to implement a complex policy. Therefore, traffic control is simpler and more flexible. In addition, in some application scenarios, a customer considers that an internally deployed IGP route is trusted and should be preferentially selected, while an external route is untrusted and should not be preferentially selected, and then the priority of the CRP route may be set to be lower than priorities of an ISIS route and an OSPF route. Therefore, it can be learned that different requirements of the customer may be met by setting the priority of the CRP route.

Optionally, the processing module 502 is further configured to store the address of the third next hop and the attribute information of the third next hop into an entry of the third next hop in the next hop table of the network device. The entry of the third next hop includes a mapping relationship between the address of the third next hop and the attribute information of the third next hop.

The address of the next hop and the attribute information of the next hop to which the address of the next hop is mapped are stored into the next hop table of the network device such that the network device may separately manage the next hop. For example, by separately deleting entry information of a next hop from the next hop table, all routing entries associated with the next hop may be deleted. Therefore, routing entries are deleted in batches, a quantity of messages exchanged between the controller and the network device can be effectively reduced, a system resource is saved, and service processing efficiency is improved.

Further, optionally, the processing module 502 is further configured to obtain the attribute information of the third next hop, and send the attribute information of the third next hop to the forwarding information base to direct packet forwarding.

Optionally, the processing module 502 is further configured to generate a fourth message. The fourth message carries route status report information. The route status report information includes a mapping relationship between the route prefix and status information of the CRP route.

The network device 500 further includes a sending module 503. The sending module 503 is configured to send the fourth message to the controller such that the controller updates statistical information of the route prefix based on the received route status report information to use updated statistical information as a basis for re-calculating the CRP route.

The status information of the CRP route includes but is not limited to a route status, for example, whether a route is valid, whether a route is to be preferentially selected, or whether a route is to be sent to the FIB, a route survival time, a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller may obtain, periodically or in real time, route status information reported by the network device, to learn a route status of the network device in real time, and use the route status information as a basis for adjusting the route, thereby improving traffic control reliability and real-time quality.

In a specific implementation, the fourth message is a fourth BGP update message used to carry the route status report information. For a message format or a field format (for example, fields or extension fields) used, refer to the description of a corresponding part in the method embodiments. Details are not described herein again.

In another specific implementation, the fourth message is a fourth PCEP message used to carry the route status report information. For a message format or a field format (for example, fields or extension fields) used, refer to the description of a corresponding part in the method embodiments. Details are not described herein again. Optionally, the processing module 502 is further configured to generate a fifth message. The fifth message carries next hop status report information. The next hop status report information includes a mapping relationship between an address of a fourth next hop and status information of the fourth next hop.

The sending module 503 is further configured to send the fifth message to the controller such that the controller updates statistical information of a next hop based on the received next hop status report information, to use updated statistical information as a basis for re-calculating the next hop of the network device.

The next hop status report information includes but is not limited to a status of a next hop, for example, whether a next hop is valid, or whether a next hop is already in use, a bandwidth occupation ratio of a next hop, a packet loss rate of a next hop, a packet sending delay of a next hop, and a survival time of a next hop.

Therefore, the controller may obtain, periodically or in real time, next hop status information reported by a forwarding device, to learn a status of the forwarding device in real time, and use the next hop status information as a basis for calculating and adjusting a next hop, thereby improving traffic control reliability and real-time quality.

In a specific implementation, the fifth message is a fifth BGP update message used to carry the next hop status report information. For a message format or a field format (for example, fields or extension fields) used, refer to the description of a corresponding part in the method embodiments. Details are not described herein again. In another specific implementation, the fifth message is a fifth PCEP message, which is used to carry the next hop status report information. For a message format or a field format (for example, fields or extension fields) used, refer to the description of a corresponding part in the method embodiments. Details are not described herein again. The network device 500 according to this embodiment of this application may correspond to a network device in the information synchronization method 200 according to the foregoing embodiment of this application, and the modules in the network device and the foregoing other operations and/or functions are respectively used to implement corresponding procedures of the method 200 in FIG. 2A and FIG. 2B. For brevity, details are not described herein again.

The controller 400 and the network device 500 that are provided in the foregoing embodiments of this application are described using only the example of division of the foregoing function modules. During actual application, the foregoing functions may be allocated to and completed by different function modules as required. That is, an internal structure of the device is divided into different function modules to complete all or some of the functions described above.

Figure 14:
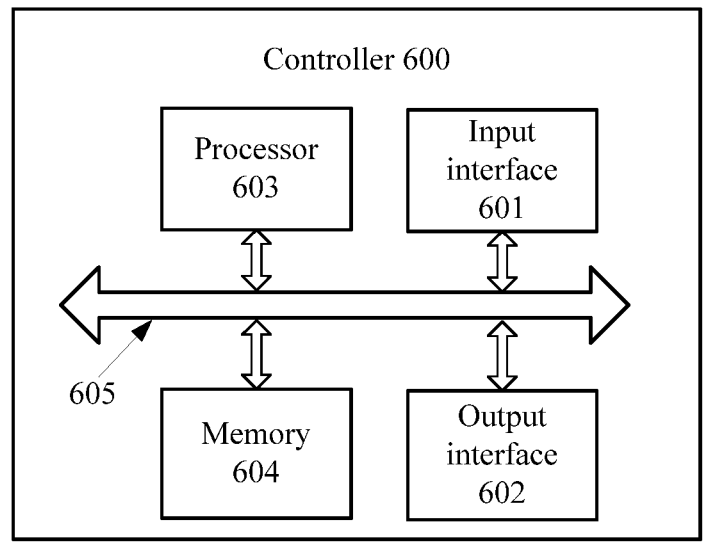
FIG. 14 is a schematic structural diagram of hardware of a controller according to an embodiment of this application.

FIG. 14 is another schematic diagram of a controller 600 according to an embodiment of this application. The controller 600 may be the controller 110 in FIG. 1, and can be configured to perform the method 200 in FIG. 2A and FIG. 2B. As shown in FIG. 14, the controller 600 includes an input interface 601, an output interface 602, a processor 603, and a memory 604. The input interface 601, the output interface 602, the processor 603, and the memory 604 may be connected using a bus system 605.

The memory 604 is configured to store a program, an instruction, or code. The processor 603 is configured to execute the program, the instruction, or the code in the memory 604 to control the input interface 601 to receive a signal, control the output interface 602 to send a signal, and complete operations of steps S201, S202, S206 to S208, and S211 to S213.

Figure 15:
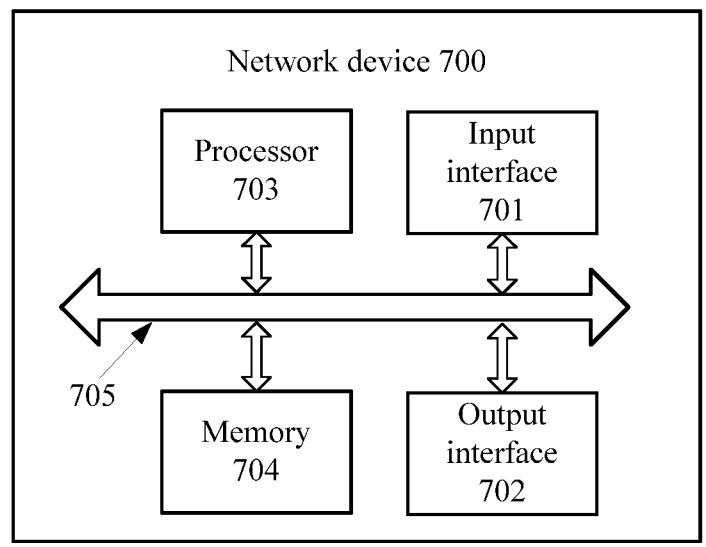
FIG. 15 is a schematic structural diagram of hardware of a network device according to an embodiment of this application.

FIG. 15 is another schematic diagram of a network device 700 according to an embodiment of this application. The network device 700 may be a network device 120 in FIG. 1, and can be configured to perform the method 200 in FIG. 2A and FIG. 2B. As shown in FIG. 15, the network device 700 includes an input interface 701, an output interface 702, a processor 703, and a memory 704. The input interface 701, the output interface 702, the processor 703, and the memory 704 may be connected using a bus system 705.

The memory 704 is configured to store a program, an instruction, or code. The processor 703 is configured to execute the program, the instruction, or the code in the memory 704 to control the input interface 701 to receive a signal, control the output interface 702 to send a signal, and complete operations of steps S203 to S205, S209, S210, S214 to S217, S219, and S220.

It should be understood that, in this embodiment of this application, the processor 603 and the processor 703 may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

The memory 604 and the memory 704 may include a read-only memory (ROM) and a random access memory (RAM), and respectively provide instructions and data to the processor 603 and the processor 703. A part of the memory 604 or the memory 704 may further include a non-volatile random access memory. For example, the memory 604 or the memory 704 may further store device type information.

In addition to a data bus, the bus system 605 and the bus system 705 may further include a power bus, a control bus, a status signal bus, and the like. However, for clear description, various types of buses in the figure are marked as the bus system.

In an implementation process, steps in the method 200 may be completed using hardware-integrated logical circuits in the processor 603 and the processor 703, or using instructions in a form of software. The steps of the information management method disclosed with reference to the embodiments of this application may be directly performed by hardware processors, or may be performed using a combination of hardware in the processors and software modules. The software module may be located in a mature storage medium in the art, such as a RAM, a flash memory, a ROM, a programmable ROM (PROM), an electrically erasable PROM (EEPROM), or a register. The storage medium is located in each of the memory 604 and the memory 704. The processor 603 reads information in the memory 604, and the processor 703 reads information in the memory 704 to complete the steps of the method 200 in combination with hardware thereof. To avoid repetition, details are not described herein again.

It should be noted that, the controllers provided in FIG. 12 and FIG. 14 and the network devices provided in FIG. 13 and FIG. 15 are applied to the SDN 100 shown in FIG. 1, to implement the information management method. In a specific implementation, the processing module 401 in FIG. 12 may be implemented by the processor 603 in FIG. 14, the sending module 402 may be implemented by the output interface 602 in FIG. 14, and the receiving module 403 may be implemented by the input interface 601 in FIG. 14. Similarly, the processing module 502 in FIG. 13 is implemented by the processor 703 in FIG. 15, the sending module 503 may be implemented by the output interface 702 in FIG. 15, and the receiving module 501 may be implemented by the input interface 701 in FIG. 15.

This application further provides a communications system, including a controller and a network device. The controller may be the controller provided in the embodiment corresponding to FIG. 12 or FIG. 14. The network device may be the network device provided in the embodiment corresponding to FIG. 13 or FIG. 15. The communications system is configured to perform the method 200 in the embodiments corresponding to FIG. 2A and FIG. 2B to FIG. 11.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and module, refer to a corresponding process in the foregoing method embodiments. Details are not described herein again.

A person skilled in the art should be aware that in the foregoing one or more examples, functions described in this application may be implemented by hardware, software, or any combination thereof. When the functions are implemented in the form of a software functional module and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a universal serial bus (USB) flash drive, a removable hard disk, a ROM, a RAM, a magnetic disk, or an optical disc.

The embodiments in this specification are all described in a progressive manner. For same or similar parts in the embodiments, refer to these embodiments. Each embodiment focuses on a difference from other embodiments. Especially, apparatus and system embodiments are basically similar to a method embodiment, and therefore are described briefly, for related parts, refer to descriptions in the method embodiment part.

Finally, it should be noted that what is described above is only examples of the embodiments of the technical solutions of this application, and is not intended to limit the protection scope of this application. A person skilled in the art can make various modifications and variations to this application without departing from the scope of this application. If these modifications and variations to this application are within the scope of the claims of this application and equivalents thereof, any such modifications, equivalent replacements, improvements, and the like shall be encompassed within the protection scope of this application.

What is claimed is:

1. An information management method, comprising:
   generating, by a first network device, a first message, wherein the first message carries an address of a first next hop of a second network device, wherein the first message comprises first identification information, wherein the first identification information instructs the second network device to withdraw, from a next hop set stored in the second network device, an entry of the first next hop corresponding to the address of the first next hop, and wherein the entry of the first next hop is associated with one or more routing entries in a routing table of the second network device; and
   sending, by the first network device, the first message to the second network device to enable the second network device to withdraw the entry of the first next hop as indicated by the first identification information, so that all routing entries associated with the entry of the first next hop in the routing table of the second network device become withdrawn,
   wherein the first message is either:
   a first Border Gateway Protocol (BGP) update message, wherein the first BGP update message comprises a multiprotocol unreachable network layer reachability information (MP_UNREACH_NLRI)

attribute field, wherein the MP_UNREACH_NLRI attribute field comprises a subsequent address family identifier (SAFI) field and an unreachable network layer reachability information (NLRI) field, wherein the SAFI field indicates that the MP_UNREACH_NLRI attribute field is encapsulated in an encapsulation format supported by a BGP synchronization address family and carries the first identification information, and wherein the unreachable NLRI field carries the address of the first next hop; or
  a first Path Computation Element Communication Protocol (PCEP) message, wherein the first PCEP message comprises a message-type field and a next hop object field, wherein the message-type field carries the first identification information, and wherein the next hop object field carries the address of the first next hop.

2. The information management method of claim 1, further comprising:
  generating, by the first network device, a second message, wherein the second message carries entry information of a second next hop of the second network device, wherein the entry information of the second next hop comprises a mapping relationship between an address of the second next hop and attribute information of the second next hop, wherein the second message comprises second identification information, and wherein the second identification information instructs the second network device to store the entry information of the second next hop into the next hop set; and
  sending, by the first network device, the second message to the second network device to enable the second network device to store the entry information of the second next hop into the next hop set based on the second identification information.

3. The information management method of claim 2, wherein the second message is either:
  a second Border Gateway Protocol (BGP) update message, wherein the second BGP update message comprises a multiprotocol reachable network layer reachability information (MP_REACH_NLRI) attribute field and a next hop attribute field, wherein the MP_REACH_NLRI attribute field comprises a subsequent address family identifier (SAFI) field, a network layer reachability information (NLRI) field, and a next hop information field, wherein the SAFI field indicates that the MP_REACH_NLRI attribute field is encapsulated in an encapsulation format supported by a BGP synchronization address family and carries the second identification information, wherein the NLRI field carries or the next hop information field carries the address of the second next hop, and wherein the Next Hop Attribute field carries the attribute information of the second next hop; or
  a second Path Computation Element Communication Protocol (PCEP) message, wherein the second PCEP message comprises a message-type field, a next hop object field, and a next hop attribute object field, wherein the message-type field carries the second identification information, wherein the next hop object field carries the address of the second next hop, and wherein the next hop attribute object field carries the attribute information of the second next hop.

4. The information management method of claim 1, wherein the first network device is a controller.

5. An information management method, comprising:
  receiving, by a second network device, a first message from a first network device, wherein the first message carries an address of a first next hop of a next hop set stored in the second network device, and wherein the first message comprises first identification information; and
  withdrawing, by the second network device from the next hop set as indicated by the first identification information, an entry of the first next hop corresponding to the address of the first next hop, so that all routing entries associated with the entry of the first next hop in a routing table of the second network device become withdrawn, wherein the entry of the first next hop is associated with one or more routing entries in the routing table of the second network device,
  wherein the first message is either:
    a first Border Gateway Protocol (BGP) update message, wherein the first BGP update message comprises a multiprotocol unreachable network layer reachability information (MP_UNREACH_NLRI) attribute field, wherein the MP_UNREACH_NLRI attribute field comprises a subsequent address family identifier (SAFI) field and an unreachable network layer reachability information (NLRI) field, wherein the SAFI field indicates that the MP_UNREACH_NLRI attribute field is encapsulated in an encapsulation format supported by a BGP synchronization address family and carries the first identification information, and wherein the unreachable NLRI field carries the address of the first next hop; or
    a first Path Computation Element Communication Protocol (PCEP) message, wherein the first PCEP message comprises a message-type field and a next hop object field, wherein the message-type field carries the first identification information, and wherein the next hop object field carries the address of the first next hop.

6. The information management method of claim 5, wherein withdrawing the entry of the first next hop comprises withdrawing, by the second network device, the entry of the first next hop regardless of whether destination addresses of all the routing entries associated with the address of the first next hop are the same.

7. The information management method of claim 5, further comprising:
  receiving, by the second network device, a second message from the first network device, wherein the second message carries entry information of a second next hop of the second network device, wherein the entry information of the second next hop comprises a mapping relationship between an address of the second next hop of the second network device and attribute information of the second next hop, and wherein the second message comprises second identification information; and
  storing, by the second network device, the entry information of the second next hop into the next hop set as indicated by the second identification information.

8. The information management method of claim 7, further comprising:
  obtaining, by the second network device, the attribute information of the second next hop; and
  sending, by the second network device, the attribute information of the second next hop to a forwarding information base to direct packet forwarding.

9. The information management method of claim 5, wherein the first network device is a controller.

10. A first network device, comprising:
a non-transitory memory storing instructions; and
a processor coupled to the non-transitory memory and configured to execute the instructions to cause the first network device to be configured to:
  generate a first message, wherein the first message carries entry information of a first next hop of a second network device, wherein the entry information of the first next hop comprises a mapping relationship between an address of the first next hop of the second network device and attribute information of the first next hop, wherein the first message comprises first identification information, wherein the first identification information instructs the second network device to store the entry information of the first next hop into a next hop set stored in the second network device, and wherein the entry information of the first next hop is associated with all routing entries that are in a routing table of the second network device and that comprise the address of the first next hop; and
  send the first message to the second network device to enable the second network device to store the entry information of the first next hop into the next hop set of the second network device based on the first identification information,
wherein the attribute information of the first next hop comprises at least one of the following attribute information types of a next hop:
  bandwidth;
  a load balancing ratio; or
  a type of the next hop,
wherein the first message is either:
  a first Border Gateway Protocol (BGP) update message, wherein the first BGP update message comprises a multiprotocol reachable network layer reachability information (MP_REACH_NLRI) attribute field and a next hop attribute field, wherein the MP_REACH_NLRI attribute field comprises a subsequent address family identifier (SAFI) field, a network layer reachability information (NLRI) field, and a next hop information field, wherein the SAFI field indicates that the MP_REACH_NLRI attribute field is encapsulated in an encapsulation format supported by a BGP synchronization address family and carries the first identification information, wherein the NLRI field or the next hop information field carries the address of the first next hop, and wherein the next hop attribute field carries the attribute information of the first next hop; or
  a first Path Computation Element Communication Protocol (PCEP) message, wherein the first PCEP message comprises a message-type field, a next hop object field, and a next hop attribute object field, wherein the message-type field carries the first identification information, wherein the next hop object field carries the address of the first next hop, and wherein the next hop attribute object field carries the attribute information of the first next hop.

11. The first network device of claim 10, wherein the instructions, when executed by the processor, further cause the first network device to be configured to:
  determine control routing protocol (CRP) routing entry information, wherein the CRP routing entry information comprises a mapping relationship between a route prefix and an address of a third next hop;
  generate a third message, wherein the third message carries the CRP routing entry information and advertises a CRP route, wherein the third message comprises third identification information, and wherein the third identification information instructs the second network device to store the CRP routing entry information into a CRP routing table of the second network device; and
  send the third message to the second network device to enable the second network device to store the CRP routing entry information into the CRP routing table based on the third identification information and to direct packet forwarding based on the CRP routing table.

12. The first network device of claim 11, wherein the CRP routing entry information comprises a route priority, and wherein the route priority identifies a priority at which the CRP route directs packet forwarding.

13. The first network device of claim 12, wherein the CRP routing entry information comprises attribute information of the third next hop, and wherein the attribute information of the third next hop comprises at least one of the following attribute information types:
  bandwidth of the third next hop;
  a load balancing ratio of the third next hop; or
  a type of the third next hop.

14. The first network device of claim 11, wherein the instructions, when executed by the processor, further cause the first network device to be configured to:
  receive a fourth message from the second network device, wherein the fourth message carries route status report information, and wherein the route status report information comprises a second mapping relationship between the route prefix and status information of the CRP route; and
  update statistical information of the route prefix based on the route status report information to set updated statistical information as a basis for re-calculating the CRP route.

15. The first network device of claim 11, wherein the instructions, when executed by the processor, further cause the first network device to be configured to:
  receive a fifth message from the second network device, wherein the fifth message carries next hop status report information, wherein the next hop status report information comprises a second mapping relationship between an address of a fourth next hop of the second network device and status information of the fourth next hop; and
  update statistical information of the fourth next hop based on the next hop status report information to set updated statistical information as a basis for re-calculating a next hop of the second network device.

16. The first network device of claim 10, wherein the first network device is a controller.

17. A second network device, comprising:
a non-transitory memory storing instructions; and
a processor coupled to the non-transitory memory and configured to execute the instructions to cause the second network device to be configured to:
  receive a first message from a first network device, wherein the first message carries entry information of a first next hop of the second network device, wherein the entry information of the first next hop comprises a first mapping relationship between an address of the first next hop of the second network device and attribute information of the first next hop, and wherein the first message comprises first identification information; and
store the entry information of the first next hop into a next hop set stored in the second network device as indicated by the first identification information, wherein the entry information of the first next hop is associated with all routing entries that are in a routing table of the second network device and that comprise the address of the first next hop,
wherein the attribute information of the first next hop comprises at least one of the following attribute information types of a next hop:
bandwidth;
a load balancing ratio; or
a type of the next hop,
wherein the first message is either:
a first Border Gateway Protocol (BGP) update message, wherein the first BGP update message comprises a multiprotocol reachable network layer reachability information (MP_REACH_NLRI) attribute field and a next hop attribute field, wherein the MP_REACH_NLRI attribute field comprises a subsequent address family identifier (SAFI) field, a network layer reachability information (NLRI) field, and a next hop information field, wherein the SAFI field indicates that the MP_REACH_NLRI attribute field is encapsulated in an encapsulation format supported by a BGP synchronization address family and carries the first identification information, wherein the NLRI field or the next hop information field carries the address of the first next hop, and wherein the next hop attribute field carries the attribute information of the first next hop; or
a first Path Computation Element Communication Protocol (PCEP) message, wherein the first PCEP message comprises a message-type field, a next hop object field, and a next hop attribute object field, wherein the message-type field carries the first identification information, wherein the next hop object field carries the address of the first next hop, and wherein the next hop attribute object field carries the attribute information of the first next hop.

18. The second network device of claim 17, wherein the instructions, when executed by the processor, further cause the second network device to be configured to:
obtain the attribute information of the first next hop; and
send the attribute information of the first next hop to a forwarding information base to direct packet forwarding.

19. The second network device of claim 17, wherein the instructions, when executed by the processor, further cause the second network device to be configured to:
receive a third message from the first network device, wherein the third message carries control routing protocol (CRP) routing entry information, wherein the CRP routing entry information comprises a second mapping relationship between a route prefix and an address of a third next hop of the second network device, and wherein the third message comprises third identification information;
store the CRP routing entry information into a local CRP routing table as indicated by the third identification information; and
direct packet forwarding based on the local CRP routing table.

20. The second network device of claim 19, wherein the CRP routing entry information further comprises a route priority, and wherein the route priority identifies a priority at which a CRP route directs the packet forwarding.

21. The second network device of claim 19, wherein the CRP routing entry information further comprises attribute information of the third next hop, wherein the attribute information of the third next hop comprises at least one of the following attribute information types:
bandwidth of the third next hop;
a load balancing ratio of the third next hop; or
a type of the third next hop, and
wherein the instructions, when executed by the processor, further cause the second network device to be configured to:
store the address of the third next hop and the attribute information of the third next hop into an entry of the third next hop in the next hop set; and
send the attribute information of the third next hop to a forwarding information base to direct the packet forwarding, wherein the entry of the third next hop comprises a third mapping relationship between the address of the third next hop and the attribute information of the third next hop.

22. The second network device of claim 19, wherein the instructions, when executed by the processor, further cause the second network device to be configured to:
generate a fourth message, wherein the fourth message carries route status report information, wherein the route status report information comprises a third mapping relationship between the route prefix and status information of a CRP route; and
send the fourth message to the first network device to enable the first network device to update statistical information of the route prefix based on the route status report information to set updated statistical information as a basis for re-calculating the CRP route.

23. The second network device of claim 17, wherein the instructions, when executed by the processor, further cause the second network device to be configured to:
generate a fifth message, wherein the fifth message carries next hop status report information, wherein the next hop status report information comprises a second mapping relationship between an address of a fourth next hop of the second network device and status information of the fourth next hop; and
send the fifth message to the first network device to enable the first network device to update statistical information of the fourth next hop based on the next hop status report information to set updated statistical information as a basis for re-calculating a next hop of the second network device.

24. The second network device of claim 17, wherein the first network device is a controller.

25. A first network device, comprising:
a non-transitory memory storing instructions; and
a processor coupled to the non-transitory memory and configured to execute the instructions to cause the first network device to be configured to:
generate a first message, wherein the first message carries an address of a first next hop of a second network device, wherein the first message comprises first identification information, wherein the first identification information instructs the second network device to withdraw, from a next hop set stored in the second network device, an entry of the first next hop corresponding to the address of the first next hop, and wherein the entry of the first next hop is associated with one or more routing entries in a routing table of the second network device; and send the first message to the second network device to enable the second network device to withdraw the entry of the first next hop as indicated by the first identification information, so that all routing entries associated with the entry of the first next hop in the routing table of the second network device become withdrawn, wherein the first message is either:

a first Border Gateway Protocol (BGP) update message, wherein the first BGP update message comprises a multiprotocol unreachable network layer reachability information (MP_UNREACH_NLRI) attribute field, wherein the MP_UNREACH_ NLRI attribute field comprises a subsequent address family identifier (SAFI) field and an unreachable network layer reachability information (NLRI) field, wherein the SAFI field indicates that the MP_UNREACH_ NLRI attribute field is encapsulated in an encapsulation format supported by a BGP synchronization address family and carries the first identification information, and wherein the unreachable NLRI field carries the address of the first next hop; or a first Path Computation Element Communication Protocol (PCEP) message, wherein the first PCEP message comprises a message-type field and a next hop object field, wherein the message-type field carries the first identification information, and wherein the next hop object field carries the address of the first next hop.

26. A second network device, comprising:

a non-transitory memory storing instructions; and a processor coupled to the non-transitory memory and configured to execute the instructions to cause the second network device to be configured to:

receive a first message from a first network device, wherein the first message carries an address of a first next hop of a next hop set stored in the second network device, and wherein the first message comprises first identification information; and withdraw, from the next hop set as indicated by the first identification information, an entry of the first next hop corresponding to the address of the first next hop, so that all routing entries associated with the entry of the first next hop in a routing table of the second network device become withdrawn, wherein the entry of the first next hop is associated with one or more routing entries in the routing table of the second network device, wherein the first message is either:

a first Border Gateway Protocol (BGP) update message, wherein the first BGP update message comprises a multiprotocol unreachable network layer reachability information (MP_UNREACH_ NLRI) attribute field, wherein the MP_UN-REACH_NLRI attribute field comprises a subsequent address family identifier (SAFI) field and an unreachable network layer reachability information (NLRI) field, wherein the SAFI field indicates that the MP_UNREACH_NLRI attribute field is encapsulated in an encapsulation format supported by a BGP synchronization address family and carries the first identification information, and wherein the unreachable NLRI field carries the address of the first next hop; or a first Path Computation Element Communication Protocol (PCEP) message, wherein the first PCEP message comprises a message-type field and a next hop object field, wherein the message-type field carries the first identification information, and wherein the next hop object field carries the address of the first next hop.

27. An information management method, comprising:

generating, by a first network device, a first message, wherein the first message carries entry information of a first next hop of a second network device, wherein the entry information of the first next hop comprises a mapping relationship between an address of the first next hop of the second network device and attribute information of the first next hop, wherein the first message comprises first identification information, wherein the first identification information instructs the second network device to store the entry information of the first next hop into a next hop set stored in the second network device, and wherein the entry information of the first next hop is associated with all routing entries that are in a routing table of the second network device and that comprise the address of the first next hop; and sending, by the first network device, the first message to the second network device to enable the second network device to store the entry information of the first next hop into the next hop set of the second network device based on the first identification information, wherein the attribute information of the first next hop comprises at least one of the following attribute information types of a next hop:

bandwidth;

a load balancing ratio; or a type of the next hop, wherein the first message is either:

a first Border Gateway Protocol (BGP) update message, wherein the first BGP update message comprises a multiprotocol reachable network layer reachability information (MP_REACH_NLRI) attribute field and a next hop attribute field, wherein the MP_REACH_NLRI attribute field comprises a subsequent address family identifier (SAFI) field, a network layer reachability information (NLRI) field, and a next hop information field, wherein the SAFI field indicates that the MP_REACH_NLRI attribute field is encapsulated in an encapsulation format supported by a BGP synchronization address family and carries the first identification information, wherein the NLRI field or the next hop information field carries the address of the first next hop, and wherein the next hop attribute field carries the attribute information of the first next hop; or a first Path Computation Element Communication Protocol (PCEP) message, wherein the first PCEP message comprises a message-type field, a next hop object field, and a next hop attribute object field, wherein the message-type field carries the first identification information, wherein the next hop object field carries the address of the first next hop, and wherein the next hop attribute object field carries the attribute information of the first next hop.

28. An information management method, comprising:

receiving, by a second network device, a first message from a first network device, wherein the first message carries entry information of a first next hop of the second network device, wherein the entry information of the first next hop comprises a mapping relationship between an address of the first next hop of the second network device and attribute information of the first next hop, and wherein the first message comprises first identification information; and storing, by the second network device, the entry information of the first next hop into a next hop set stored in the second network device as indicated by the first identification information, wherein the entry information of the first next hop is associated with all routing entries that are in a routing table of the second network device and that comprise the address of the first next hop, wherein the attribute information of the first next hop comprises at least one of the following attribute information types of a next hop:
bandwidth;
a load balancing ratio; or
a type of the next hop,
wherein the first message is either:
a first Border Gateway Protocol (BGP) update message, wherein the first BGP update message comprises a multiprotocol reachable network layer reachability information (MP_REACH_NLRI) attribute field and a next hop attribute field, wherein the MP_REACH_NLRI attribute field comprises a subsequent address family identifier (SAFI) field, a network layer reachability information (NLRI) field, and a next hop information field, wherein the SAFI field indicates that the MP_REACH_NLRI attribute field is encapsulated in an encapsulation format supported by a BGP synchronization address family and carries the first identification information, wherein the NLRI field or the next hop information field carries the address of the first next hop, and wherein the next hop attribute field carries the attribute information of the first next hop; or a first Path Computation Element Communication Protocol (PCEP) message, wherein the first PCEP message comprises a message-type field, a next hop object field, and a next hop attribute object field, wherein the message-type field carries the first identification information, wherein the next hop object field carries the address of the first next hop, and wherein the next hop attribute object field carries the attribute information of the first next hop.

* * * * *